United States Patent
Lee et al.

(10) Patent No.: US 7,263,357 B2
(45) Date of Patent: Aug. 28, 2007

(54) METHOD FOR FAST ROAMING IN A WIRELESS NETWORK

(75) Inventors: In-Sun Lee, Seoul (KR); Kyung-Hun Jang, Suwon-si (KR); Min-Ho Shin, Laurel, MD (US); William Albert Arbaugh, Ellicott City, MD (US); Arunesh Mishra, Greenbett, MD (US)

(73) Assignees: Samsung Electronics Co., Ltd. (KR); The University of Maryland, College Park, MD (US)

( * ) Notice: Subject to any disclaimer, the term of this patent is extended or adjusted under 35 U.S.C. 154(b) by 284 days.

(21) Appl. No.: 10/752,675

(22) Filed: Jan. 8, 2004

(65) Prior Publication Data

US 2004/0242228 A1 Dec. 2, 2004

Related U.S. Application Data

(60) Provisional application No. 60/439,891, filed on Jan. 14, 2003.

(51) Int. Cl.
*H04Q 7/20* (2006.01)
*H04M 1/66* (2006.01)

(52) U.S. Cl. .................. 455/432.1; 455/410; 455/436; 455/435.1

(58) Field of Classification Search ............. 455/432.1, 455/4, 6, 436, 410, 435.1; 713/156, 158, 713/175, 150; 370/331, 338
See application file for complete search history.

(56) References Cited

U.S. PATENT DOCUMENTS

2004/0103282 A1* 5/2004 Meier et al. ................. 713/171
2004/0203783 A1* 10/2004 Wu et al. .................... 455/436
2004/0236939 A1* 11/2004 Watanabe et al. ........... 713/150
2005/0117524 A1* 6/2005 Lee et al. .................... 370/254

* cited by examiner

*Primary Examiner*—Naghmeh Mehrpour
(74) *Attorney, Agent, or Firm*—The Farrell Law Firm

(57) ABSTRACT

A roaming service method for a fast and secure wireless network is provided. In an embodiment of the present invention, an AP, which an STA associates with, transmits security keys needed for roaming to neighbor APs of the AP. When the STA moves to one of the neighbor APs, a reassociation is carried out between the STA and the neighbor AP using the already provided security key. In another embodiment of the present invention, an authentication server transmits security keys needed for roaming to neighbor APs to which the STA is likely to move, so that when the STA moves to one of the neighbor APs, a reassociation is carried out between the STA and the neighbor AP using the already provided security key.

27 Claims, 21 Drawing Sheets

△△ Access Point

---▶ Movement of the Station

METHOD FOR FAST ROAMING IN A WIRELESS NETWORK

PRIORITY

This application claims priority under 35 U.S.C. § 119 to an application entitled "Method for Fast Roaming in a Wireless Network" filed in the U.S. Patent and Trademark Office on Jan. 14, 2003 and assigned Ser. No. 60/439,891, the contents of which are incorporated herein by reference.

GOVERNMENT RIGHTS

This invention was made with Government support under Contract No. 60NANB1D0113 awarded by the National Institute of Standards and Technology, and under Contract No. MDA90402C0428 awarded by the National Security Agency. The U.S. Government has certain rights in the invention.

BACKGROUND OF THE INVENTION

1. Field of the Invention

The present invention relates generally to a roaming service in a fast and secure wireless network, and in particular, to a method of providing a security key to minimize time required for a roaming service.

2. Description of the Related Art

A LAN (Local Area Network) is a collection of personal terminals, main frames, and workstations which share a common communication link generally within a range of 300 m. The LAN is a fast communication network built within a distance that allows an accurate transfer of current or signals between the personal terminals. For example, the LAN provides connectivity to equipment within an office building so that workers can efficiently share the information contained on the equipment. In its initial developmental stage, the LAN usually adopted as its communication link a wired network that directly transfers electrical signals. Along with the development of wireless protocols, a wireless network has substituted for the wired network. A LAN using a wireless network is called WLAN (Wireless LAN) or in-building wireless network. One WLAN is based on IEEE 802.11 and proposed by the U.S. IEEE (International Electric and Electronic Engineers) group. IEEE 802.11-based WLAN has seen rapid growth and deployment in the recent years. Owing to convenient network connectivity, the widespread deployment of the WLAN in the future is easily predicted. To meet increasing demands for a very high-speed wireless Internet, existing WLAN systems emerge as a foundation for a fast wireless public network. The WLAN attracts more attention because of the expectations that the WLAN provides a high speed link which mobile communication systems do not and guarantees secure communications for WLAN users owing to the rapid development of WLAN security technology. Therefore, the WLAN security technology as well as the increase of data rate is a significant task to achieve for the WLAN systems.

The IEEE 802.11 network MAC (media access control) specification allows for two operating modes, namely, ad hoc and infrastructure. In the ad hoc mode, two or more wireless stations (STAs) recognize each other and establish a peer-to-peer communication without any existing infrastructure, whereas in the infrastructure mode, there is a fixed entity referred to an access point (AP) that bridges all data between the STAs associated with it. An AP and associated STAs form a basic service set (BSS) communicating on the unlicensed RF (Radio Frequency) spectrum.

FIG. 1 illustrates the configuration of a typical WLAN that supports the infrastructure mode.

Referring to FIG. 1, a plurality of APs 120a and 120b are connected via a single distributed system (DS) 110. The DS 110 is a wired network and establishes a communication link between the APs 120a and 120b. Each of the APs 120a and 120b forms a predetermined service area and bridges between the DS 110 and STAs 130a and 130b (or 130c and 130d) within its service area. As mentioned before, an AP and associated STAs form a BSS and a service is provided on a BSS basis. A collection of the APs 120a and 120b can extend the BSSs to an extended service set (ESS). The STAs 130a to 130d authenticate to their respective APs 120a and 120b to access the WLAN system. In other words, the STAs 130a to 130d are allowed to access the network only by an authentication procedure. The authentication involves transfer of state information. The state information contains a key (hereinafter, referred to as a security key) that provides security between the DS and the STA or between the AP and the STA.

As stated above, to communicate with the DS via a particular AP, an STA needs a security key. Hereinbelow, a process of assigning a security key is defined as authentication. The authentication procedure involves encryption key distribution and an encryption algorithm to encrypt wireless data.

The IEEE 802.11 standard regulates that data is encrypted by a WEP (Wired Equivalent Privacy) algorithm and the encryption key is shared preliminarily and used as fixed. For details, see "ISO/IEC, "Wireless LAN Medium Access Control (MAC) and Physical layer (PHY) specifications," ISO/IEC 8802-11, ANSI/IEEE Std 802.11, 1999".

To correct wireless security flaws of the IEEE 802.11-based WLAN systems, IEEE 802.11i specifies IEEE 802.1X/1aa-based access control, security session management, dynamic key exchange and key management, and application of a new symmetric key encryption algorithm for protection of wireless data. IEEE 802.1X/1aa provides a framework for user authentication and key exchange, whereas IEEE 802.11i regulates that IEEE 802.1X/1aa can be used as a comprehensive framework for user authentication and key exchange. IEEE 802.11i further defines 4-way handshake as a key exchange method, key hierarchy, and new cipher suites.

FIG. 12 is a view illustrating a signal flow for WLAN security access based on IEEE 802.1X/1aa and IEEE 802.11i. As noted from FIG. 12, IEEE 802.11 access, IEEE 802.1X authentication, IEEE 802.11i key exchange, and IEEE 802.1aa authentication must be connected to one another to authorize connection to an external network via an AP through authentication and key exchange.

FIG. 2 illustrates a hierarchy of security keys for the typical WLAN. Referring to FIG. 2, the security keys include a master key (MK), a pairwise master key (PMK), and a pairwise transient key (PTK). A higher-layer server, an AAA (Authentication, Authorization and Accounting) server in the DS derives the PMK from the MK and provides it to an STA via an AP to which the STA has connectivity. The AP and the STA generate the PTK from the PMK. The MK, already known to the STA as well as the AAA server, provides security between the STA and the AAA server. The PTK provides security between the STA and the AP. The PTK serves as a key confirmation key (KCK), a key encryption key (KEK), and a temporal key. Bits 0–127 of the PTK are assigned to the KCK, bits 128 to 255 to the KEK, and the remaining bits to the temporary key.

FIG. 3 illustrates an example of key assignment to each component in the typical WLAN. The key assignment presupposes that a new STA 340 attempts to access a first AP 320 (AP1). Referring to FIG. 3, an AAA server 310 generates a PMK from a known MK upon request for key assignment from the STA 340 and transmits it to AP1. AP1 in turn provides the PMK to the STA 340 and derives a PTK from the PMK. The STA 340 also generates the PTK from the PMK. Hence, the STA 340 knows the MK, PMK and PTK. A RADIUS (Remote Authentication Dial-In User Service) server is generally used as the AAA server 310.

Because of the mobility-enabling nature of the WLAN having the configuration illustrated in FIG. 1, the STA can move from a prior-AP to a new-AP. To continue an on-going service provided by the prior-AP, a roaming service is needed for the STA. The AP to which the STA had physical layer connectivity is referred to as the prior-AP or current-AP, while the AT to which the STA gets physical layer connectivity after roaming is referred to as the new-AP.

The roaming process refers to the mechanism or sequence of messages exchanged between APs and an STA. To continue an on-going service in the new-AP after roaming, the STA needs an additional security key, accurately speaking, another PMK.

The complete roaming process can be divided into two distinct logical steps: discovery and re-authentication as described below.

1. Discovery: Attributing to mobility, the signal strength and the signal-to-noise ratio of the signal from an STA's current AP might degrade and cause it to loose connectivity and to initiate a handoff. At this point, the STA might not be able to communicate with its current AP (prior-AP). Thus, the STA needs to find potential APs in range to potentially associate with. This is accomplished by a MAC layer scan function. During a scan, the STA listens for beacon messages sent out periodically by APs at a rate of 10 ms on assigned channels. Thus the STA can create a list of APs prioritized by the received signal strength.

There are two kinds of scanning methods defined in the standard: active and passive. As the names suggest, in the passive mode, the STA searches for the potential APs simply by listening for beacon messages. In the active mode, apart from listening to beacon messages, the STA sends additional probe broadcast packets on each channel and receives responses from APs. Thus, the STA actively probes for the APs.

2. Re-authentication: The STA attempts to reauthenticate to an AP according to the priority list. The re-authentication process typically involves an authentication and a reassociation to the new-AP. The re-authentication phase involves the transfer of a security key from the prior-AP. This can be achieved through an IAPP (Inter Access Point Protocol). The re-authentication process can be divided into the authentication phase and the reassociation phase.

FIG. 4 illustrates a re-authentication procedure performed by an EAP-TLS protocol for a roaming service in a conventional WLAN. In the illustrated case, it is assumed that an STA 440 moves from AP_A 420 to AP_B 430. Thus AP_A 420 is a prior-AP and AP_B 430 is a new-AP. Referring to FIG. 4, the STA 440 recognizes that AP_B 430 exists as a neighbor AP in the discovery phase and then requests from AP_A 420 a security key by which to communicate with AP_B 430. AP_A 420 requests the security key from an AAA server 410 via AP_B 430. The AAA server 410 generates a new PMK and provides it to AP_B 430. AP_B 430 stores the PMK and provides it to AP_A 420. AP_A 420 in turn provides the PMK to the STA 440. Thus the STA 440 and AP_B 430 can create a PTK from the PMK. When the STA 440 moves to AP_B 430, it can maintain an on-going service using the PTK.

As described above, in the conventional roaming process, the STA moves from the current AP, scans all potential APs, and associates with an AP having the highest RSSI (Received Signal Strength Indicator). The association procedure starts with requesting a PMK for the new-AP and ends with creating a PTK from the PMK.

Accordingly, the conventional roaming process involves probe delay in the discovery phase, and pre-authentication delay in the re-authentication phase.

1. Probe Delay: Messages from an active scan for roaming are referred to as probe messages. The latency for this process is called probe delay. The STA transmits a probe request message and waits for responses from APs on each channel. Probe wait latency is defined as the time the STA waits on one particular channel after sending the probe request. This is measured as the time difference between subsequent probe request messages. Thus according to the above procedure, the traffic on the channel and the timing of probe response messages affect the probe-wait time.

2. Pre-Authentication Delay: This is the latency incurred during the exchange of re-authentication frames. Pre-authentication consists of two or four consecutive frames depending on the authentication method used by the AP. The pre-authentication delay has been described with reference to FIG. 4.

As described above, the conventional WLAN involves various delays during roaming of an STA. As a result, a total roaming time is extended to 1 to 13 seconds. This implies that communication disconnection from the STA is lengthened, which may adversely affect service quality. Even fast roaming may be impossible when the STA fails to receive a security key for communication with the new AP from the current AP.

SUMMARY OF THE INVENTION

An object of the present invention is to substantially solve at least the above problems and/or disadvantages and to provide at least the advantages below. Accordingly, an object of the present invention is to provide a method of minimizing delay involved in a roaming process.

Another object of the present invention is to provide a roaming service method for precluding the effects of the security system of a prior-AP on that of a new-AP even if the security system of the prior-AP is impaired.

A further object of the present invention is to provide a method of providing neighbor APs with security keys needed for roaming by a security caching technique.

Still another object of the present invention is to provide a method of acquiring security keys for neighbor APs using a security key used for an AP which an STA is currently associated with and providing the security keys to the neighbor APs.

Still further object of the present invention is to provide a method of providing security keys to neighbor APs using an AP-neighborhood graph managed by an AP, which an STA is currently associated to.

Yet another object of the present invention is to provide a method of distributing security keys to APs neighboring an AP which an STA is currently associated with in an authentication server.

Yet further object of the present invention is to provide a method of managing an AP-neighborhood graph to distribute security keys to APs neighboring a current AP, which an STA is currently associated to in a higher-layer server.

Yet still another object of the present invention is to provide a method of performing a roaming process between a neighbor AP and an STA using a security key distributed to the neighbor AP before the roaming process.

The above objects are achieved by providing a roaming service method for a fast and secure wireless network.

According to one aspect of the present invention, in a wireless network, having at least two APs, each AP having a predetermined service area, and an STA that receives a communication service by associating with a first AP being one of the at least two APs, to support a roaming service for the STA, the first AP generates an AP-neighborhood graph with neighbor APs to which the STA is likely to move, acquires security keys for the respective neighbor APs based on association information gained from the association of the STA to the first AP, and transmits the security keys to the respective neighbor APs by security caching. Thus, a pre-authentication is performed such that when the STA attempts to roam to one of the neighbor APs, fast roaming is provided via a security key provided to the neighbor AP.

According to another aspect of the present invention, in a wireless network having at least two APs, each AP having a predetermined service area, and an STA that receives a communication service by associating with a first AP being one of the at least two APs, to support a roaming service for the STA, a neighbor AP of the first AP, which is managed by an AP-neighborhood graph drawn for the first AP, receives a security key from the first AP by security caching from among security keys generated by the first AP for respective neighbor APs using association information gained from the association of the STA to the first AP, and performs fast roaming using the security key when the STA attempts to roam to the neighbor AP.

According to a further aspect of the present invention, in a wireless network having at least two APs, each AP having a predetermined service area, and an STA that receives a communication service by associating with a first AP being one of the at least two APs, to support a roaming service between the first AP and a neighbor AP of the first AP, managed by an AP-neighborhood graph drawn for the first AP, security keys are acquired for respective neighbor APs based on association information and transmits the security keys to the respective APs by security caching. Here, the association information is gained by the first AP from the association of the STA to the first AP. The neighbor AP receives a security key from the first AP and performs fast roaming using the security key when the STA attempts to roam to the neighbor AP.

According to the first three aspects of the present invention, it is preferred that the association information includes a PMK and an RK, which are acquired by the first AP, and the MAC addresses of the STA and the neighbor APs.

According to still another aspect of the present invention, in a wireless network having at least two APs, each AP having a predetermined service area, an STA that receives a communication service by associating with a first AP being one of the at least two APs, an authentication server (AS) that authenticates the STA, and an accounting server that provides billing for the STA, to support a roaming service for the STA, the accounting server generates an AP-neighborhood graph for the first AP to manage neighbor APs to which the STA is likely to move from the first AP. When the first AP reports to the accounting server completed association of the STA to the first AP, the accounting server notifies the neighbor APs of the association. Each of the neighbor APs requests a security key to the AS in response to the notification from the accounting server. The AS generates a security key for each of the neighbor APs based on association information from the association of the STA to the first AP in response to the request and transmits the security key to each of the neighbor APs. When the STA attempts to roam to one of the neighbor APs, a neighbor AP, to which the STA is to form a connection, performs a pre-authentication, so that fast roaming can be carried out using the security key provided to the neighbor AP.

According to the fourth aspect of the present invention, it is preferred that the association information includes an MK, a PMK assigned to the first AP, and the MAC addresses of the STA and the neighbor APs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
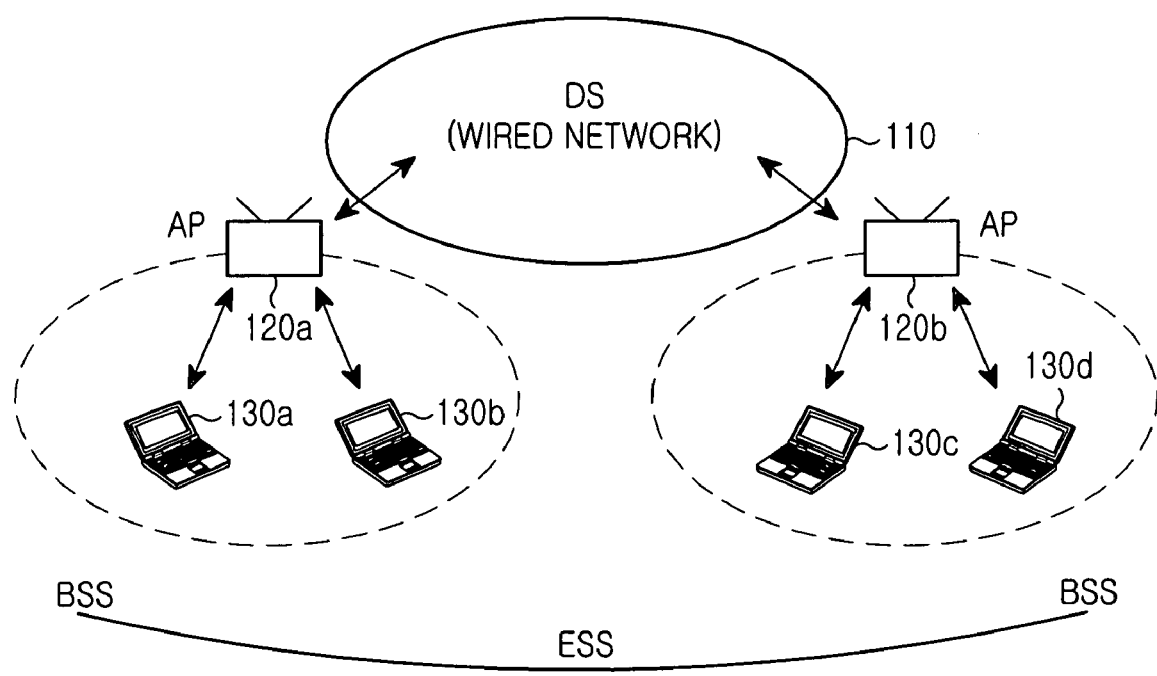
FIG. 1 illustrates the configuration of a typical WLAN as an example of a wireless network.
Figure 2:
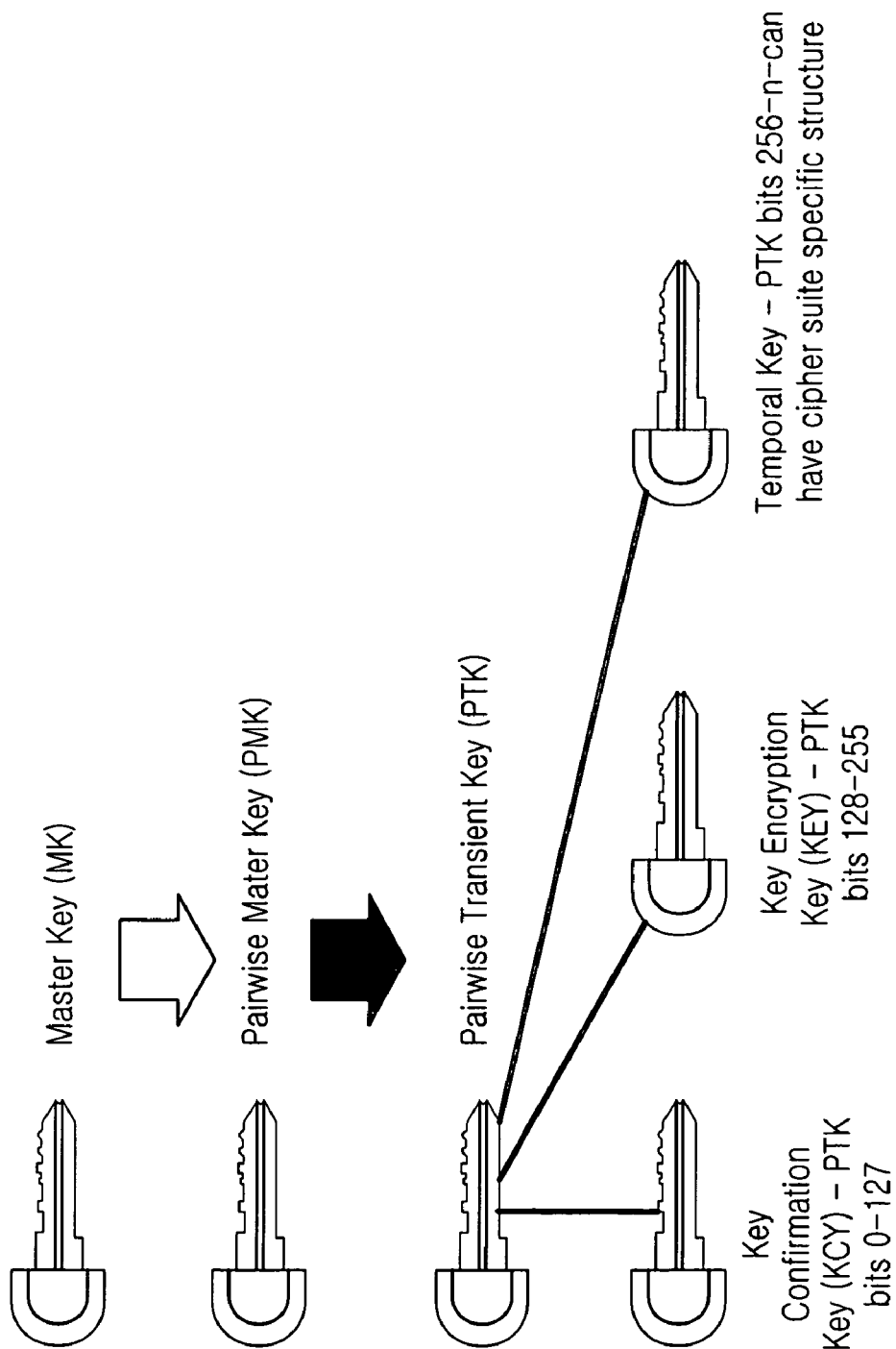
FIG. 2 illustrates a hierarchy of security keys in the typical WLAN.
Figure 3:
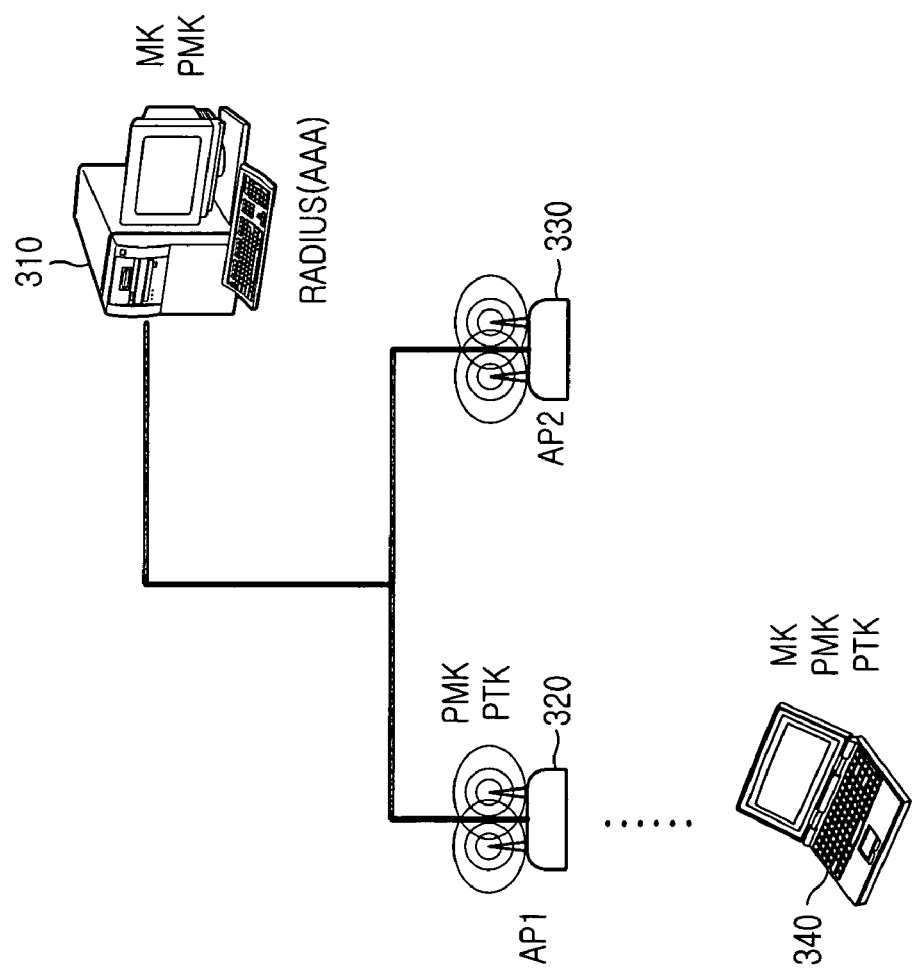
FIG. 3 illustrates an example of key assignment to each component in the typical WLAN.
Figure 4:
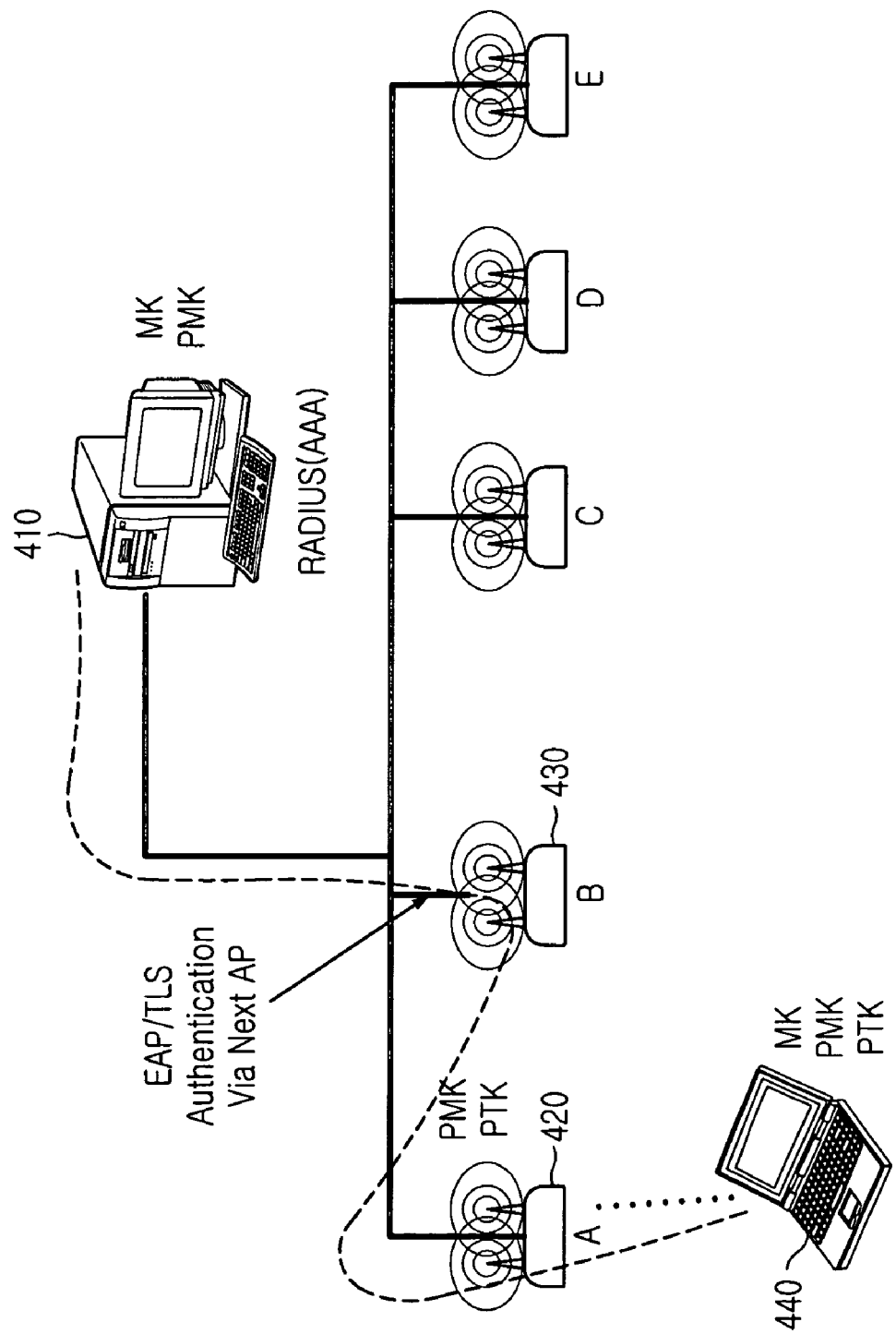
FIG. 4 illustrates assignment of a security key needed for roaming in a conventional WLAN.

Preferred embodiments of the present invention will be described herein below with reference to the accompanying drawings. In the following description, well-known functions or constructions are not described in detail since they would obscure the invention in unnecessary detail.

Three schemes can be considered to support fast roaming in a WLAN.

First, APs each preserve all necessary security keys for roaming. Each AP reserves memory space for the roaming service, stores all security keys needed for the roaming service in the memory, and retrieves one security key from the memory when necessary. A distinctive shortcoming of this scheme is the requirement of a large-capacity memory.

A second scheme is to provide neighbor APs with necessary security keys for roaming by security caching accomplished by the IAPP protocol. To do so, each AP manages information about its neighbor APs using an AP-neighborhood graph. Also, the AP generates security keys for the neighbor APs using a known security key and provides the generated security keys to the neighbor APs by the security caching.

The third scheme is that a higher-layer server (accounting server) manages neighbor APs for each AP and provides the neighbor APs with security keys necessary for roaming when an STA accesses the AP. To implement this scheme, the higher-layer server is provided to manage the AP-neighborhood graph for each AP. The higher-layer server may be an existing AAA server or a separately procured server. Depending on the amount of information regarding the managed AP-neighborhood graphs, a plurality of higher-layer servers can be used.

The above-described second and third schemes are implemented as first and second embodiments of the present invention. These embodiments commonly require the AP-neighborhood graph by which neighbor APs are managed for each AP. They differ in that each AP manages its AP-neighborhood graph in the first embodiment, while a higher-layer server manages its AP-neighborhood graph in the second embodiment. In the embodiments of the present invention, the process of providing potential APs with security keys needed for roaming is further included. The AP-neighborhood graph is required in both embodiments since the potential APs are a set of APs to which an STA may move. The AP-neighborhood graph defines connections between an STA and its potential APs, which the STA may be associated with by roaming. Hence, before detailing the embodiments of the present invention, the process of how the AP-neighborhood graph is created will first be described.

1. Generation of AP-Neighborhood Graph

The AP-neighborhood graph required to implement the present invention can be generated based on the locations of APs in a WLAN. Because potential APs are different for each AP, an AP-neighborhood graph is created for each AP. This is done in three methods. One of them is that an administrator manually generates AP-neighborhood graphs for individual APs based on the locations of the APs and registers them. Each time a change is made to the AP layout, the administrator updates the AP-neighborhood graphs. Another method is that initial AP-neighborhood graphs are registered by the administrator and automatically updated each time the AP layout is changed.

The third method is that the AP-neighborhood graph is automatically generated for each AP and automatically updated each time the AP layout is changed. According to this method, however, roaming is carried out by the conventional roaming process until the AP-neighborhood graph is generated. In other words, a procedure for checking connections to each AP is needed. For example, if an STA associated to AP_A attempts to initially roam to AP_B that the STA has never moved to, AP_B performs an IAPP procedure to receive a context corresponding to the STA from AP_A. AP_A and AP_B then confirm that there is a connection between them for roaming and thus can update their AP-neighborhood graphs. After the updating, the STA can roam from AP_A to AP_B or vice versa without the IAPP procedure.

The physical path and distance between APs are considerations to take into account when constructing an AP-neighborhood graph in any of the above methods. To draw a connection between APs in an AP-neighborhood graph, there must exist a physical connection between the APs without passing through any other AP. Also, the distance between the physically connected APs should not exceed a threshold. As a matter of fact, the STA would perform an initial procedure for establishing a communication with a nearby AP rather than roam to a remote AP.

An example of an AP-neighborhood graph will be shown below.

Figure 5A:
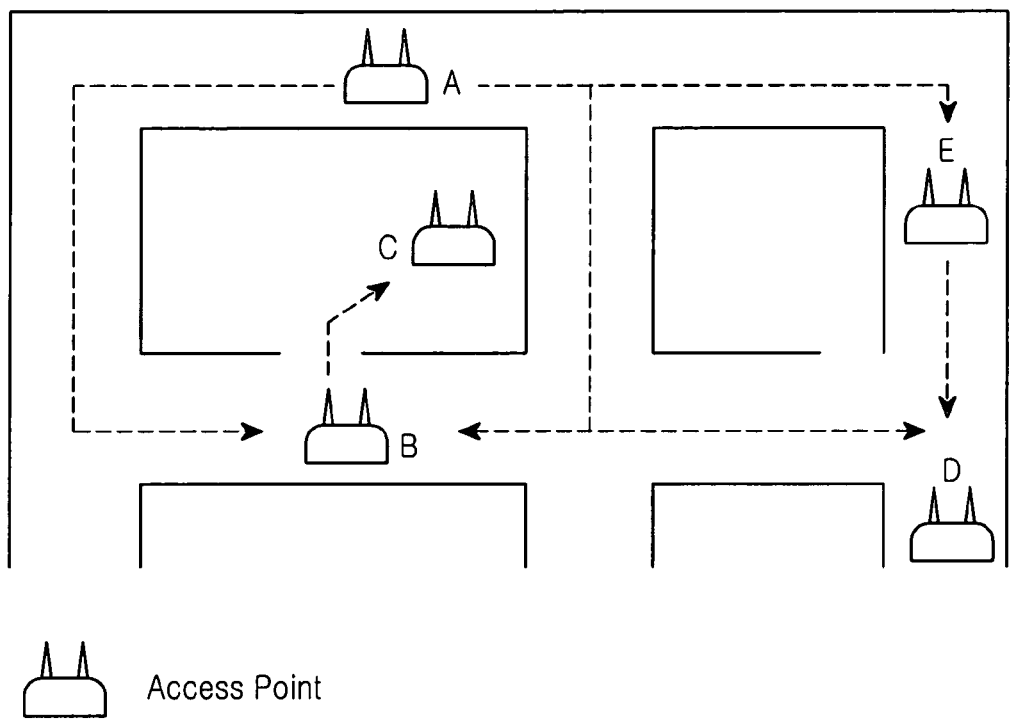
FIGS. 5A and 5B illustrate AP-neighborhood graph generation according to the present invention.
Figure 5B:
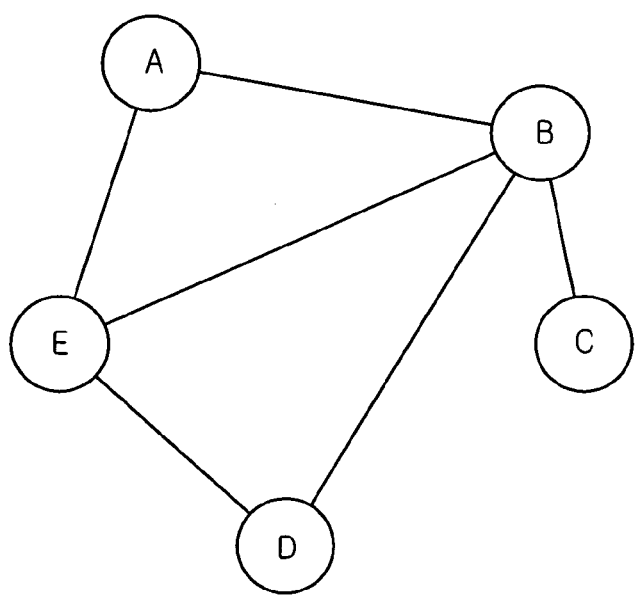

FIG. 5A illustrates an example of an AP layout in a WLAN to which the present invention is applied and FIG. 5B illustrates an AP-neighborhood graph constructed based on the AP layout.

Referring to FIG. 5A, AP_C is located in a closed space with one entrance. Thus AP_B is the only AP to which an STA can move from AP_C. This implies that roaming only to AP_B is allowed for the STA in AP_C. Meanwhile, an STA in AP_B can move to any of AP_A, AP_D, AP_E and AP_C because corridors (physical connections) run from AP_B to these APs. That is, the STA is free to roam from AP_B to all APs illustrated in FIG. 5A. If the STA is located in AP_A, it can only move to AP_B or AP_E without passing through any other AP. Hence, the STA can roam from AP_A to AP_B or AP_E. AP_E is directly connected to all APs except AP_C, so that an STA in AP_E can roam to any of the APs other than AP_C. Direct roaming for an STA from AP_D is confined to AP_B and AP_E. Roaming from AP_A to AP_D, or from AP_D to AP_A, is not allowed due to a long distance between them. Instead of roaming, the STA reassociates to AP_B before it roams to AP_D or AP_A.

Referring to FIG. 5B, the illustrated AP-neighborhood graph shows all of the connections among the APs in the WLAN. Yet, the above-described second neighborhood graph generation method is viable as long as each AP has knowledge of potential APs to which it may have connectivity. For example, knowledge of AP_B and AP_E as potential APs is substantially sufficient for AP_A and knowledge of AP_A, AP_C, AP_D and AP_E as potential APs is substantially sufficient for AP_B. On the other hand, in the third neighborhood graph generation method, an accounting server manages an AP-neighborhood graph for each AP.

As mentioned earlier, the AP-neighborhood graph is manually generated by the administrator or automatically generated by the conventional handoff procedure.

In the case where each AP automatically generates an AP-neighborhood graph, upon receipt of a reassignment request message from an STA, the AP determines whether a temporarily stored context corresponding to the STA exists. The AP is a new-AP for the STA. If the context exists, it means that the AP has already created an AP-neighborhood graph containing a prior-AP to which the STA had connectivity. On the contrary, if the context is absent, it means that connectivity to the prior-AP has not yet been defined in the AP-neighborhood graph. The new-AP then receives the context corresponding to the STA from the prior-AP by the conventional IAPP procedure and updates the AP-neighborhood graph so that a connection line is drawn between the new-AP and the prior-AP in the AP-neighborhood graph.

In this manner, the AP-neighborhood graph is generated in the first embodiment of the present invention characterized by management of the AP-neighborhood graph at each AP. Meanwhile, in the second embodiment of the present invention, since a higher-layer server manages an AP-neighborhood graph for each AP, when a new connection is established, a corresponding AP reports the new connection to the higher-layer server so that the AP-neighborhood graph of the AP can be updated with the latest information. It is also possible that if an STA roams to a new-AP, the higher-layer server updates an AP-neighborhood graph for a prior-AP by adding the new-AP to the graph as a neighbor AP of the prior-AP.

2. First Embodiment

An AP generates PMKs for neighbor APs managed in its AP-neighborhood graph and transmits the PMKs to the neighbor APs using a security caching technique accomplished by the IAPP protocol. When an STA roams to one of the neighbor APs, a security system operates based on the PMK provided to the neighbor AP, thereby enabling fast roaming.

The security caching technique refers to a scheme in which each AP recognizes potential APs that it may get connectivity to by its AP-neighborhood graph, generates PMKs for the potential APs, and transmits the PMKs to the neighbor APs. Therefore, re-authentication latency involved in the roaming process is minimized. The security caching technique is based on a locality of mobility principle. In this environment, an STA association pattern is the sequence of APs that the STA becomes associated with in a given interval of time.

The first embodiment of the present invention will be detailed with reference to the attached drawings. It is assumed herein that each AP manages its own AP-neighborhood graph.

Figure 6:
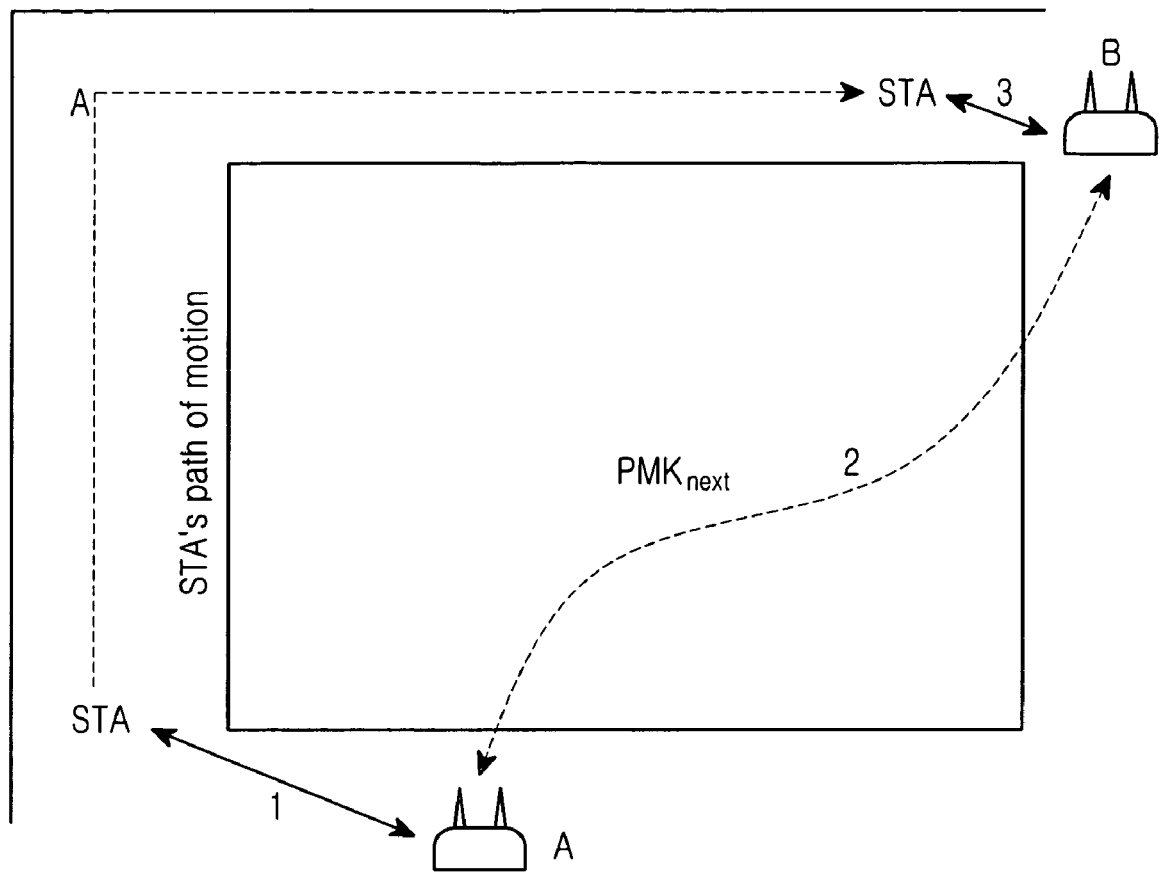
FIG. 6 illustrates an example of a roaming path in which an STA roams, referred to for describing the present invention.

FIG. 6 is a view conceptually illustrating a roaming process by the security caching technique according to the present invention. The roaming process presupposes that an STA moves from AP_A to AP_B.

Referring to FIG. 6, the STA transmits an association request to AP_A in step 1. AP_A authenticates the STA in a general initial authentication procedure and acquires a security key. The STA already knows an MK used for security between the STA and an AAA server (not shown) and receives a PMK from the AAA server. AP_A receives the PMK from the AAA server. Both the STA and the AP_A then acquire a PTK and an RK (Roam Key). A random number (RN) is needed to generate the RK and a 4-way handshake is carried out using the PMK to generate the PTK. The RN is generated during the 4-way handshake. Obviously, the RN may be generated in any other way. After the authentication, AP_A transmits a response for the association request to the STA. Thus, the STA communicates with AP_A.

Meanwhile, AP_A generates a PMK for a neighbor AP, AP_B, managed by its AP-neighborhood graph. Let the PMK for the neighbor AP be $PMK_{next}$. $PMK_{next}$ is generated using the RK, the current PMK, $PMK_{curr}$, the MAC address of the STA, $STA_{mac}$, and the MAC address of a new-AP, next $AP_{mac}$ by a PRF (Pseudo-Random Function), expressed as $$PMK_{next}=PRF(RK,PMK_{curr},STA_{mac},nextAP_{mac}) \qquad (1)$$

where $STA_{mac}$ is known to AP_A during communication and next $AP_{mac}$ is information that AP_A receives by the IAPP protocol or from the AAA server.

In step 2, AP_A transmits $PMK_{next}$ to AP_B. While one AP is assumed as a potential AP in the case illustrated in FIG. 6, if a plurality of potential APs exist, AP_A transmits PMKs, $PMK_{next}$ calculated for the respective potential APs to each of them. AP_B stores $PMK_{next}$ in a cache. As the STA moves to AP_B in the shown path, the STA requests a reassociation to AP_B in step 3. To maintain an on-going communication service in response to the reassociation request, a security system must be established between AP_B and the STA. That is, a PTK must be gained for security between AP_B and the STA. The PTK is derived from a PMK, namely $PMK_{next}$. Hence, AP_B sets $PMK_{next}$ as the PMK by which AP_B can communicate with the STA. Meanwhile, the STA can gain $PMK_{next}$ in various ways. For example, AP_A or AP_B provides the STA with $PMK_{next}$. Or the STA can directly generate $PMK_{next}$ from next $AP_{mac}$ received from AP_A or AP_B.

As AP_B and the STA acquire the same PMK, the PTK can be created in the conventional method, so that a normal security system can be established between them. Consequently, the latency involved with the conventional pre-authentication is reduced, thereby enabling fast roaming and achieving implementation speedups. In the mean time, AP_B generates $PMK_{next}$ using an RK achieved together with the PTK and transmits $PMK_{next}$ to its neighbor APs, in preparation for roaming of the STA to any of the neighbor APs.

In the embodiment of the present invention, the security caching technique is adopted to provide a security key used to preserve security between an STA and at least one predicted new-AP to which the STA becomes associated. Apart from the roaming process, the security caching involves the transfer of the security key from a prior-AP to potential new-APs. To implement the security caching technique, potential new-APs for each AP must be predicted. This has been detailed in relation to the AP-neighborhood graph.

Figure 7:
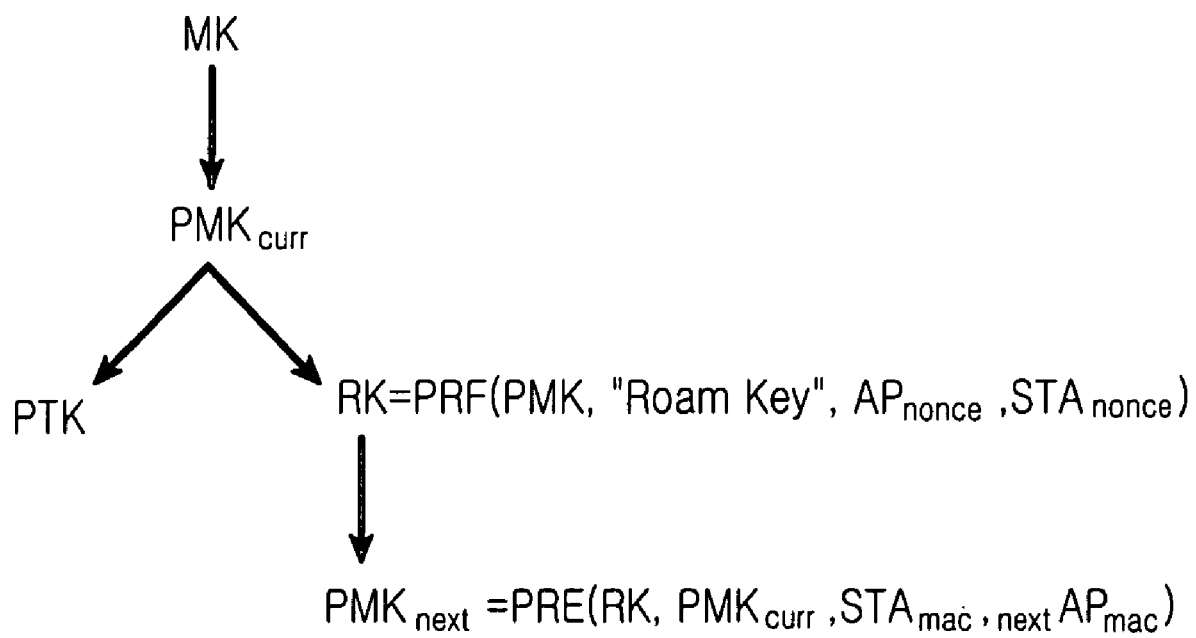
FIG. 7 illustrates generation of security keys according to an embodiment of the present invention.

FIG. 7 illustrates a security key generation procedure according to the first embodiment of the present invention.

Referring to FIG. 7, the AAA server generates $PMK_{curr}$, for an AP, $AP_{curr}$ that the STA initially attempts to access and transmits $PMK_{curr}$ to $AP_{curr}$. $AP_{curr}$ acquires a PTK and an RK from $PMK_{curr}$. The RK is determined using a PRF expressed as $$RK=PRF(PMK,\text{"Roam Key"},AP_{nonce},STA_{nonce}) \qquad (2)$$

where $AP_{nonce}$ is a random number set by $AP_{curr}$, $STA_{nonce}$ is a random number set by the STA, and "Roam Key" is the RN generated during the 4-way handshake.

After the RK is gained by Eq. (2), a PMK for a neighbor AP, $PMK_{next}$ is computed by Eq. (1) and transmitted to $AP_{next}$ by the security caching technique. In the presence of a plurality of neighbor APs, as many PMKs, $PMK_{next}$ as the number of the neighbor APs are generated.

The provisioning of the fast roaming service with a reduced reassociation latency owing to the security caching technique will be described in detail with reference to FIGS. 8A, 8B and 8C. It is to be appreciated that the following description is under the assumption that the STA is initially connected to AP_A, and AP_B and AP_E are neighbor APs to AP_A.

Figure 8A:
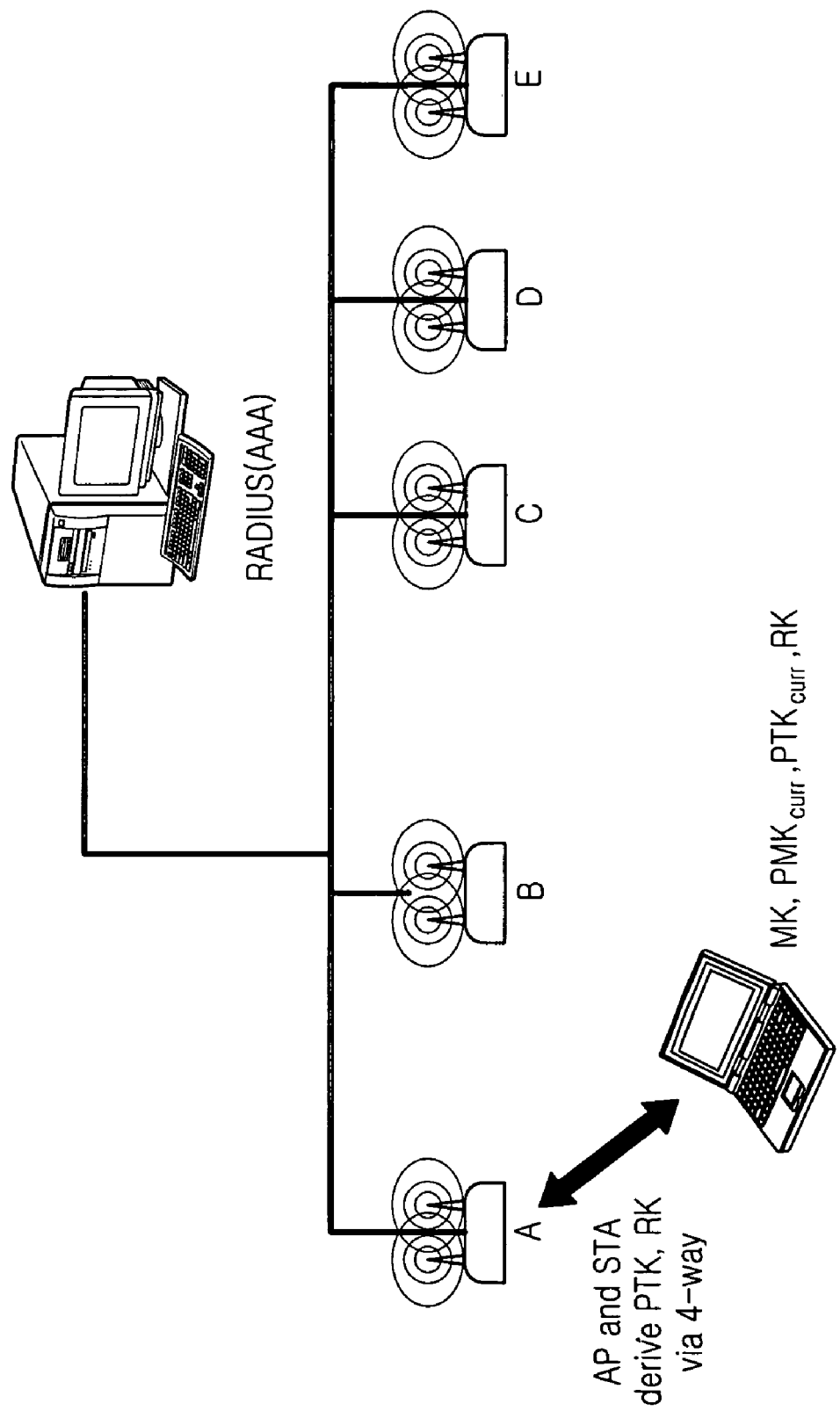
FIGS. 8A, 8B and 8C illustrate a roaming process according to the embodiment of the present invention.

FIG. 8A illustrates acquisition of necessary security keys in AP_A and the STA when the STA initially attempts to access AP_A. The security keys the STA acquires are MK, $PMK_{curr}$, $PTK_{curr}$ and RK, while the security keys AP_A acquires are $PMK_{curr}$, $PTK_{curr}$ and RK. The procedure for acquiring the security keys has been described earlier and thus its description is not provided here.

Figure 8B:
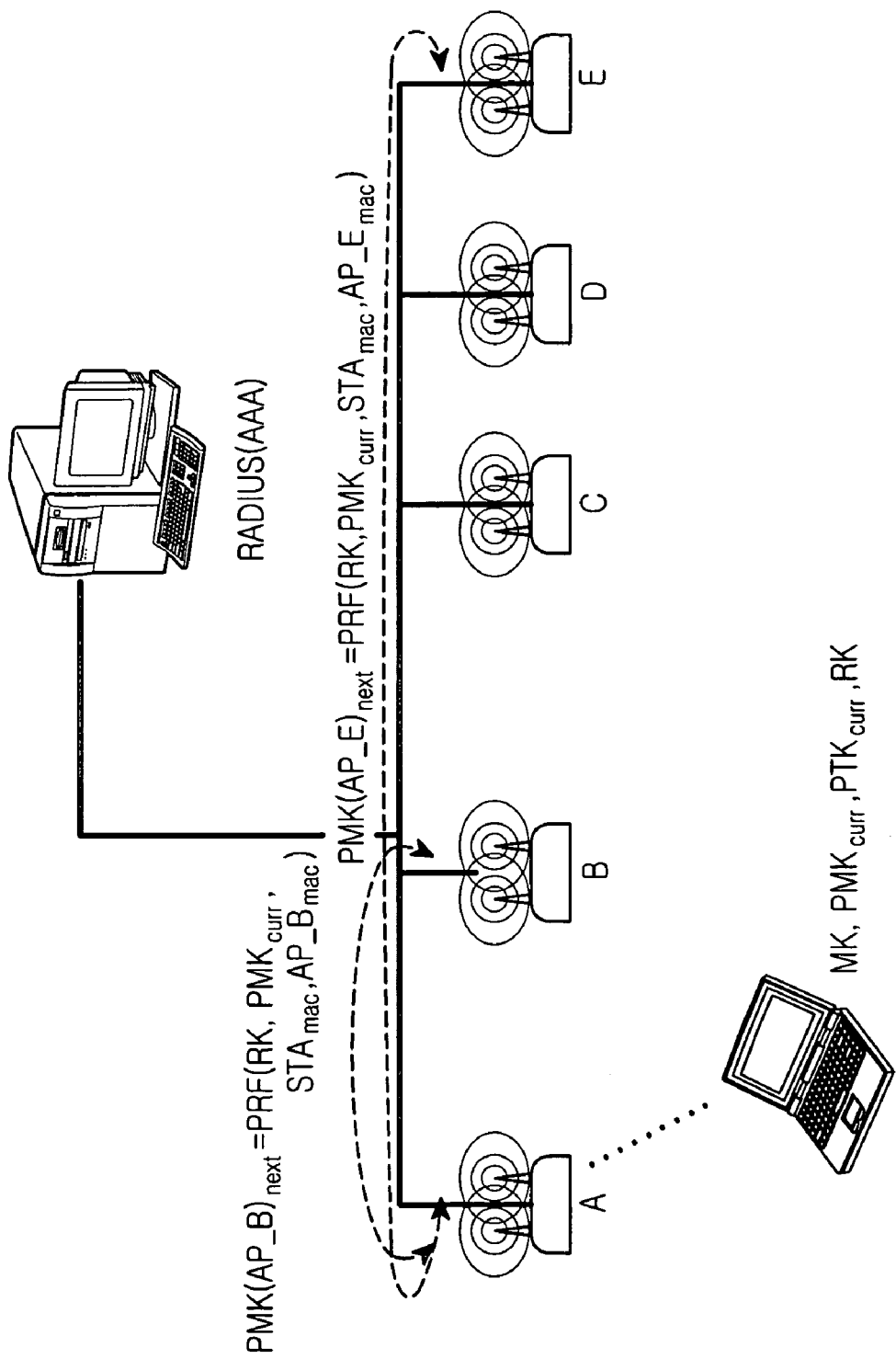

FIG. 8B illustrates the generation of PMKs for neighbor APs using the security keys in AP_A and the transfer of them from AP_A to the neighbor APs by the security caching technique. In this example the neighbor APs to AP_A are AP_B and AP_E. $PMK_{next}$ for AP_B ($PMK(AP\_B)_{next}$) is determined by $$PMK(AP\_B)_{next}=PRF(RK,PMK_{curr},STA_{mac},AP\_B_{mac}) \qquad (3)$$

and $PMK_{next}$ for AP_E ($PMK(AP\_E)_{next}$) is determined by $$PMK(AP\_E)_{next}=PRF(RK,PMK_{curr},STA_{mac},AP\_E_{mac}) \qquad (4)$$

For roaming that may occur later, the STA must have knowledge of $PMK_{next}$ corresponding to the neighbor APs. In accordance with the first embodiment of the present invention, the STA gains $PMK_{next}$ corresponding to the neighbor APs in two ways, AP_A directly provides the STA with $PMK_{next}$ delivered to the neighbor APs; and AP_A provides the STA with MAC addresses needed to calculate $PMK_{next}$ for the neighbor APs. In the latter case, the STA computes $PMK_{next}$ for the respective neighbor APs by Eq. (3) and Eq. (4).

Figure 8C:
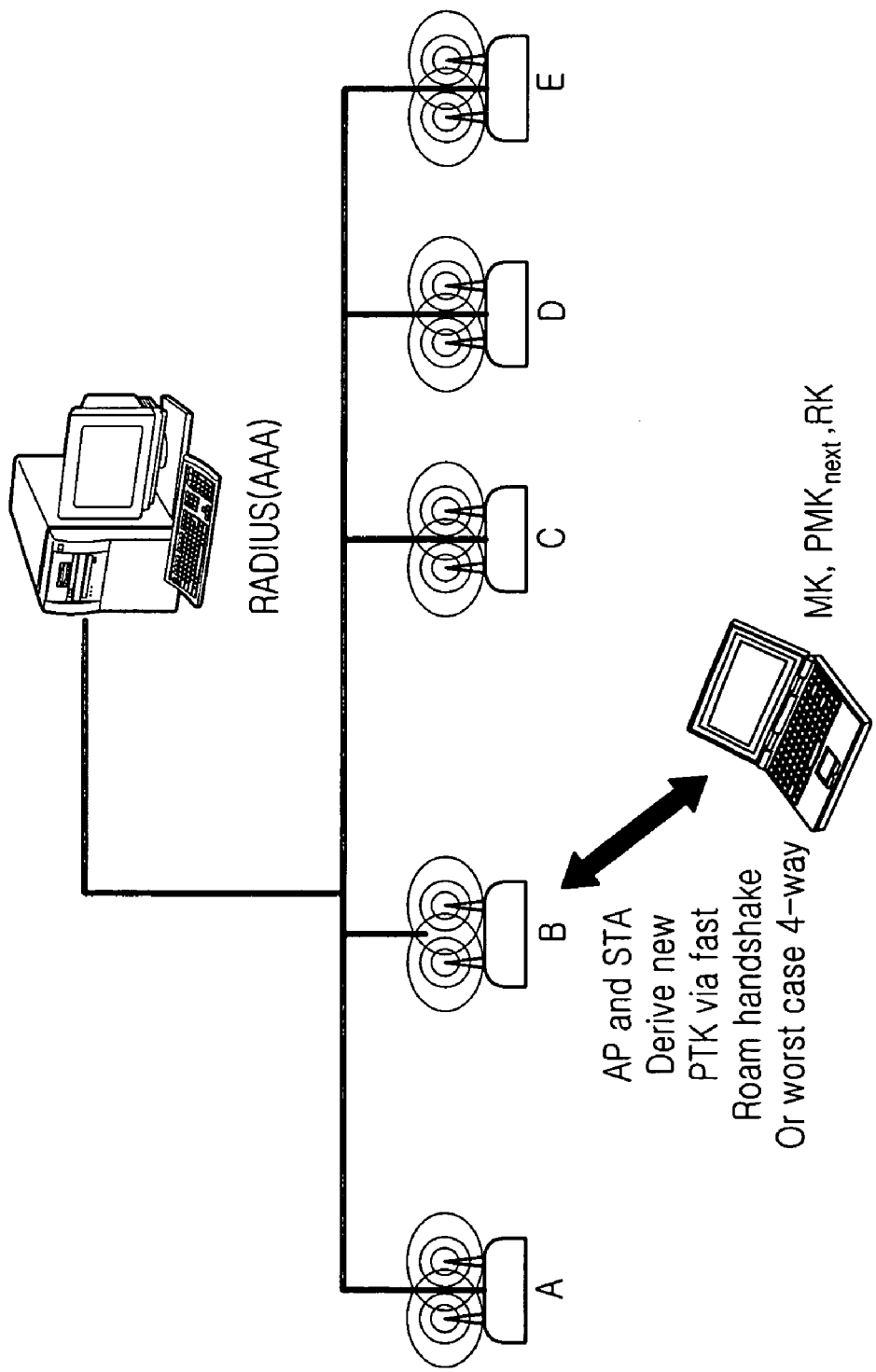

FIG. 8C illustrates AP_B's resumption of a communication service that AP_A provided, using $PMK_{next}$ after the STA moves from AP_A to AP_B. AP_B translates $PMK_{next}$ received from AP_A into its PMK. If the STA attempts to access AP_B, AP_B derives a PTK from the PMK. Similarly, the STA acquires the PTK using already known $PMK_{next}$. Thus, the STA resumes the communication service with AP_B, which was provided in AP_A. Meanwhile, AP_B acquires the PTK and an RK simultaneously. Using the RK, AP_B generates PMKs for its neighbor APs managed by its AP-neighborhood graph. AP_B transmits the PMKs to the neighbor APs by the security caching technique.

Although the case illustrated in FIGS. 8A, 8B and 8C has been detailed on the assumption that the STA roams from AP_A to AP_B, the STA can roam from AP_B to AP_A in the same procedure.

Figure 9:
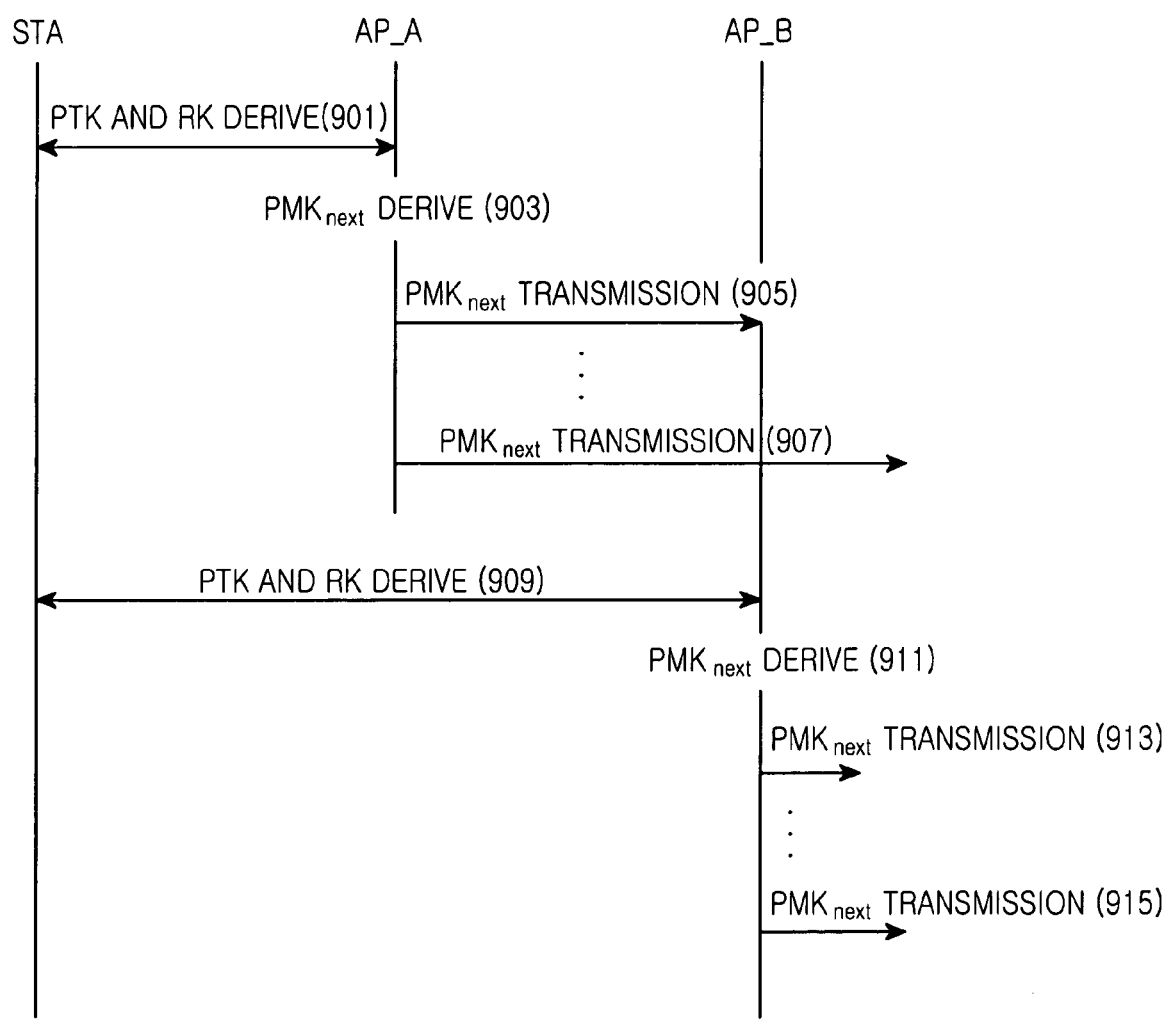
FIG. 9 is a diagram illustrating signaling in the roaming process according to the embodiment of the present invention.

FIG. 9 is a diagram illustrating signaling between the STA and the APs in the roaming process according to the first embodiment of the present invention. Let AP_A be a prior-AP and AP_B be a new-AP. Since the STA accesses AP_A and after roaming, the STA operates with AP_B in the conventional manner, the following description is focused on the signaling for the roaming process.

Referring to FIG. 9, the STA and AP_A derive a PTK and an RK from a PMK received from the AAA server (not shown) in step 901 so that they are capable of communicating with each other. AP_A derives PMKs, $PMK_{next}$ for its neighbor APs in step 903 and transmits the PMKs to its neighbor APs in steps 905 to 907. Thus the neighbor Aps now have the PMKs which will be used for security when the STA moves to them.

As the STA roams to AP_B, the STA and AP_B derive a PTK and an RK from $PMK_{next}$ in step 909, so that STA and AP_B establish a security system that allows a communication service from AP_A to be resumed in AP_B. AP_B generates PMKs, $PMK_{next}$ for its neighbor APs in step 911 and transmits the PMKs to its neighbor APs in steps 913 to 915.

In accordance with the first embodiment of the present invention, the need for accessing the AAA server for pre-authentication needed to provide a roaming service for the STA is eliminated, thereby reducing time required for roaming. This implies that fast roaming is enabled.

3. Second Embodiment

Higher-layer servers manage neighbor APs for individual APs by their AP-neighborhood graphs. When necessary, the servers generate PMKs for APs neighboring to a particular AP and transmits them to the neighbor APs. Thus when an STA roams to one of the neighbor APs, a security system operates using the already known PMK, thereby providing fast roaming.

The second embodiment of the present invention presupposes that the AP-neighborhood graphs are managed by a novel higher-layer server, an accounting server. The accounting server may be incorporated in an existing AAA server or implemented as a separate server. Also, a plurality of accounting servers can be adopted according to the amount of information regarding the managed AP-neighborhood graphs. It is to be appreciated that the following description is made in the context of an accounting server implemented independently of an existing AAA server and this AAA server free of the accounting function is called an authentication server (AS).

With reference to FIGS. 10A to 10E, fast roaming through security key distribution from the higher-layer servers will be described in detail on the assumption that the STA initially accesses AP_A, and AP_B and AP_E are neighboring to AP_A.

Figure 10A:
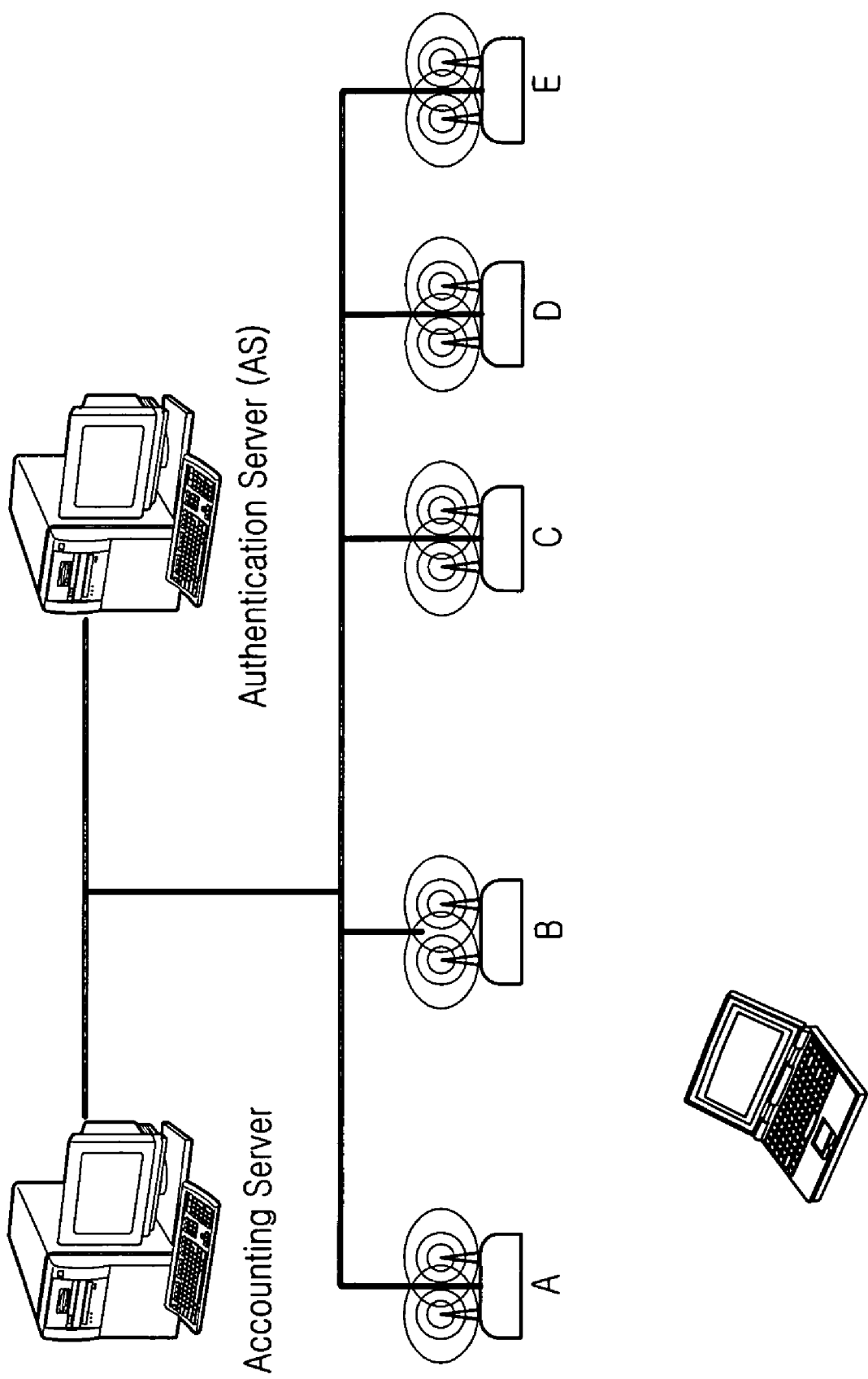
FIGS. 10A to 10E illustrate a roaming process according to another embodiment of the present invention.

Referring to FIG. 10A, as the STA initially attempts to associate to AP_A, AP_A and the STA each acquire their necessary security keys. An MK, a PMK and a PTK are security keys for the STA, while the PMK and the PTK are security keys for AP_A. How the keys are acquired has been detailed earlier and thus its description is not provided here. The acquisition of the security keys is equivalent to establishment of a security system that allows communication between the STA and AP_A.

Figure 10B:
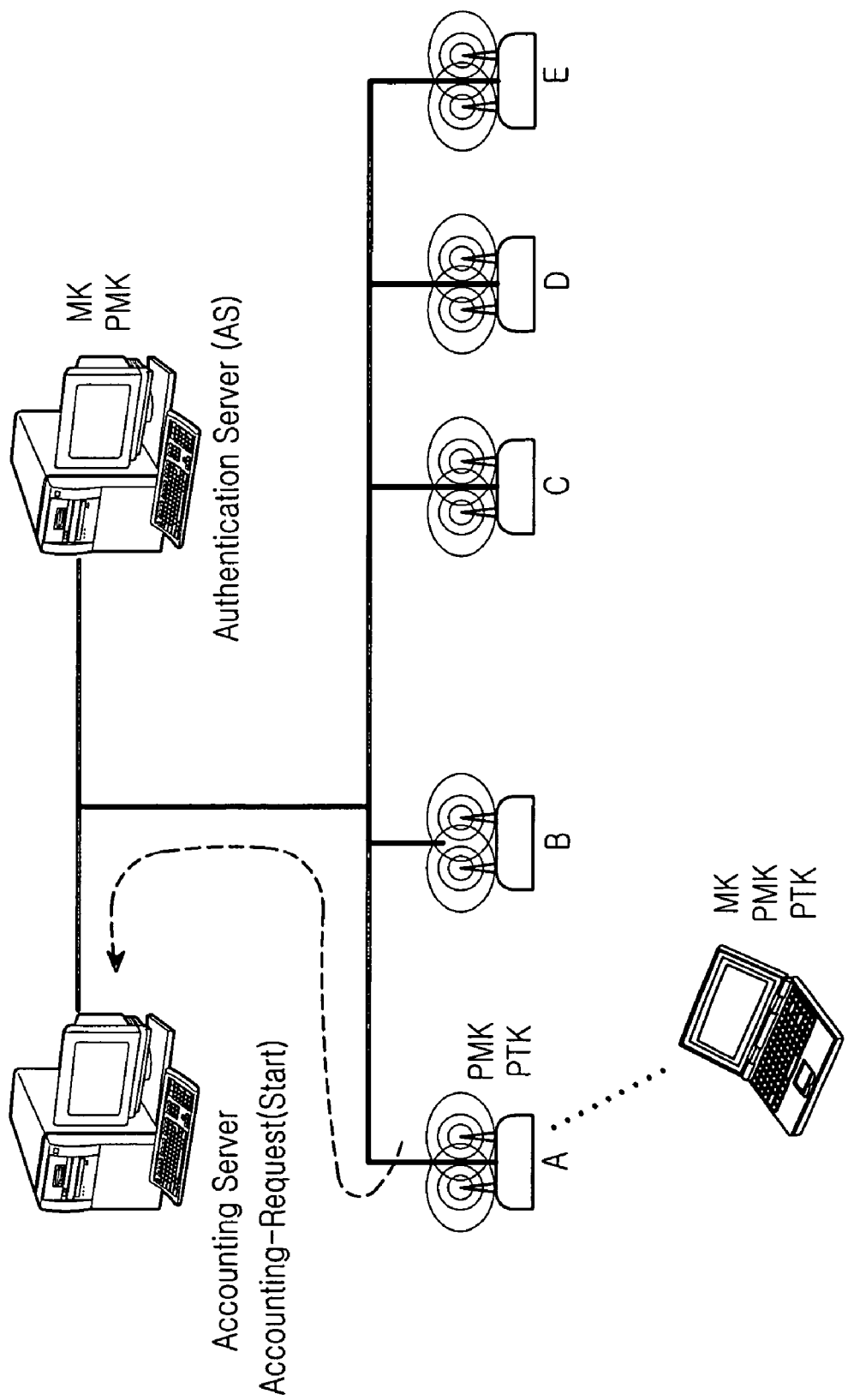

Referring to FIG. 10B, AP_A notifies the accounting server of the initiation of a communication service with the STA, for example by an Accounting-Request message. Thus the accounting server executes an accounting function for the STA and announces the initiation of the communication service between the STA and AP_A to the neighbor APs.

Figure 10C:
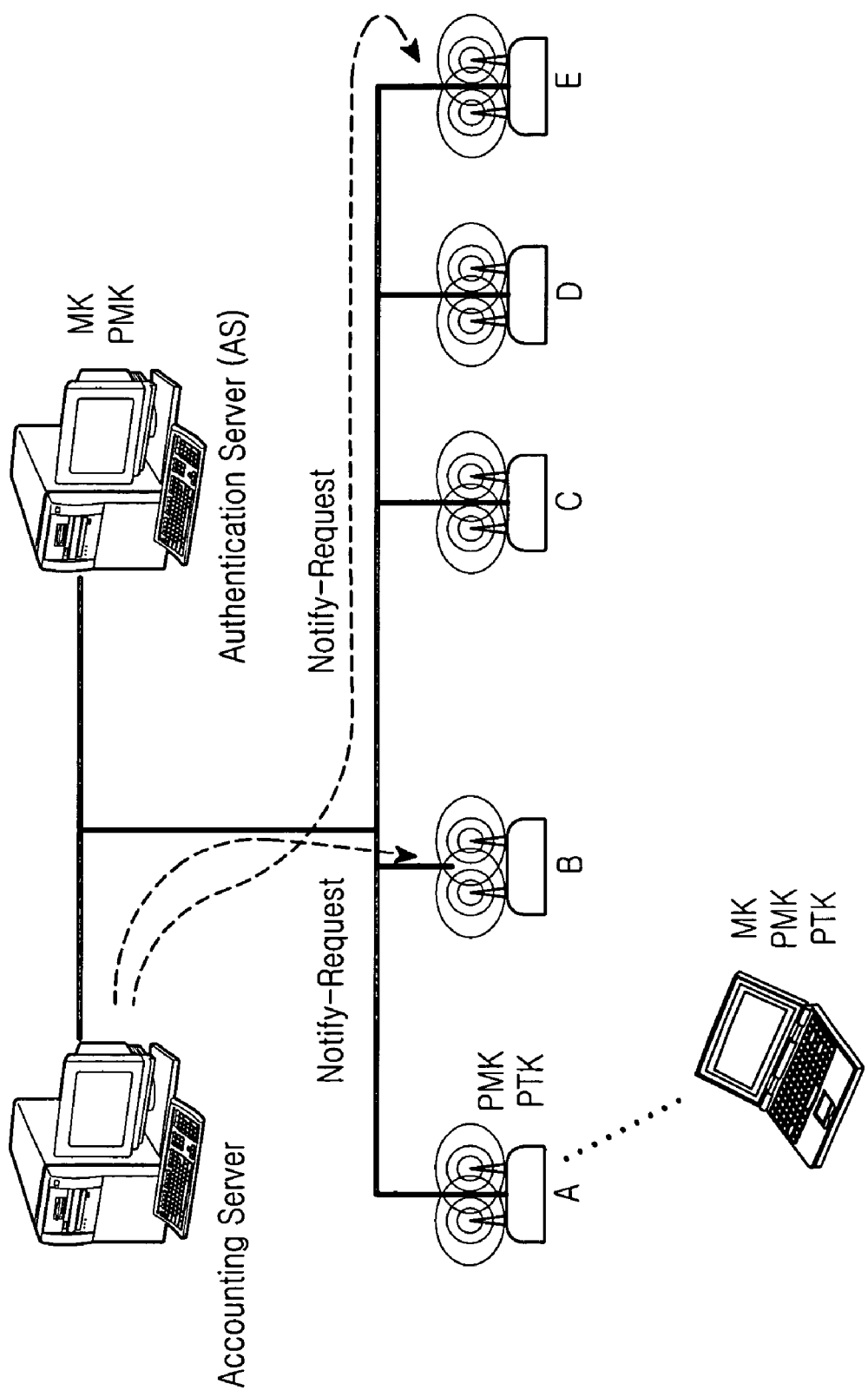

Referring to FIG. 10C, the accounting server searches for the neighbor APs using an AP-neighborhood graph that the accounting server manages for AP_A, and notifies by a Notify-Request message the neighbor APs, AP_B and AP_E, that the STA has associated to AP_A. The Notify-Request message includes the MAC address of the STA, STA-mac-Addr. Upon receipt of the Notify-Request message, AP_B and AP_E consider that the STA is likely to move from AP_A to them.

Figure 10D:
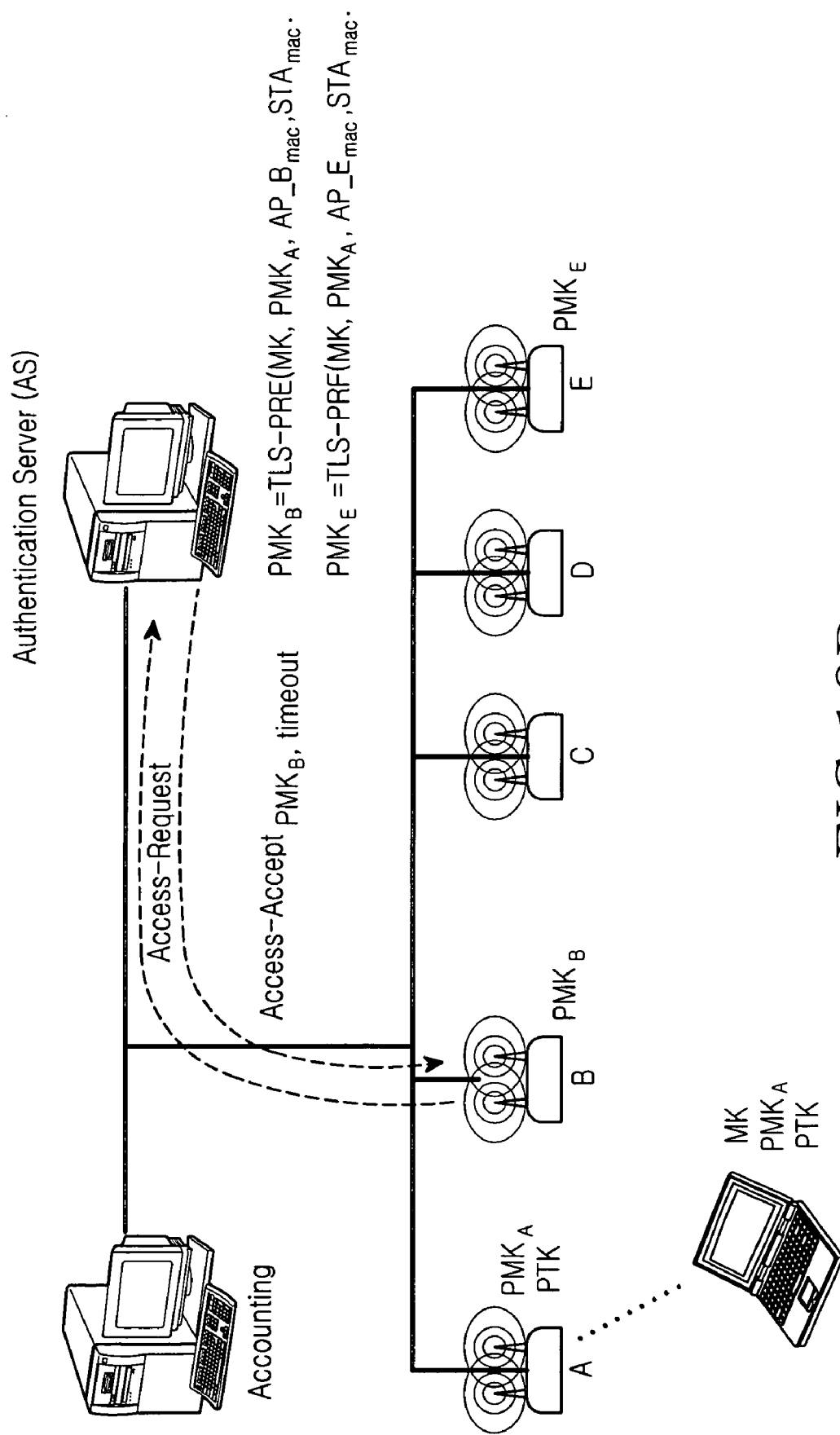

Referring to FIG. 10D, the AS provides the neighbor APs (AP_B shown as a representative) with PMKs by which they can communication with the STA if and when it roams to them. Specifically, AP_B transmits to the AS an Access-Request message including STA-mac-Addr received from the accounting server, and the AS generates a PMK, $PMK_B$ for AP_B by $$PMK_B = PRF(MK, PMK_A, STA_{mac}, AP\_B_{mac}) \quad (5)$$

where $PMK_A$ is a PMK assigned to AP_A, and $STA_{mac}$ and $AP\_B_{mac}$ are the respective MAC addresses of the STA and AP_B.

The AS transmits to AP_B an Access-Accept message including $PMK_B$. By receiving the Access-Accept message, AP_B acquires the PMK to use for security between the STA and AP_B when the STA moves to AP_B. While FIG. 10D illustrates an operation between AP_B and the AS, the same thing is also applicable to AP_E.

Figure 10E:
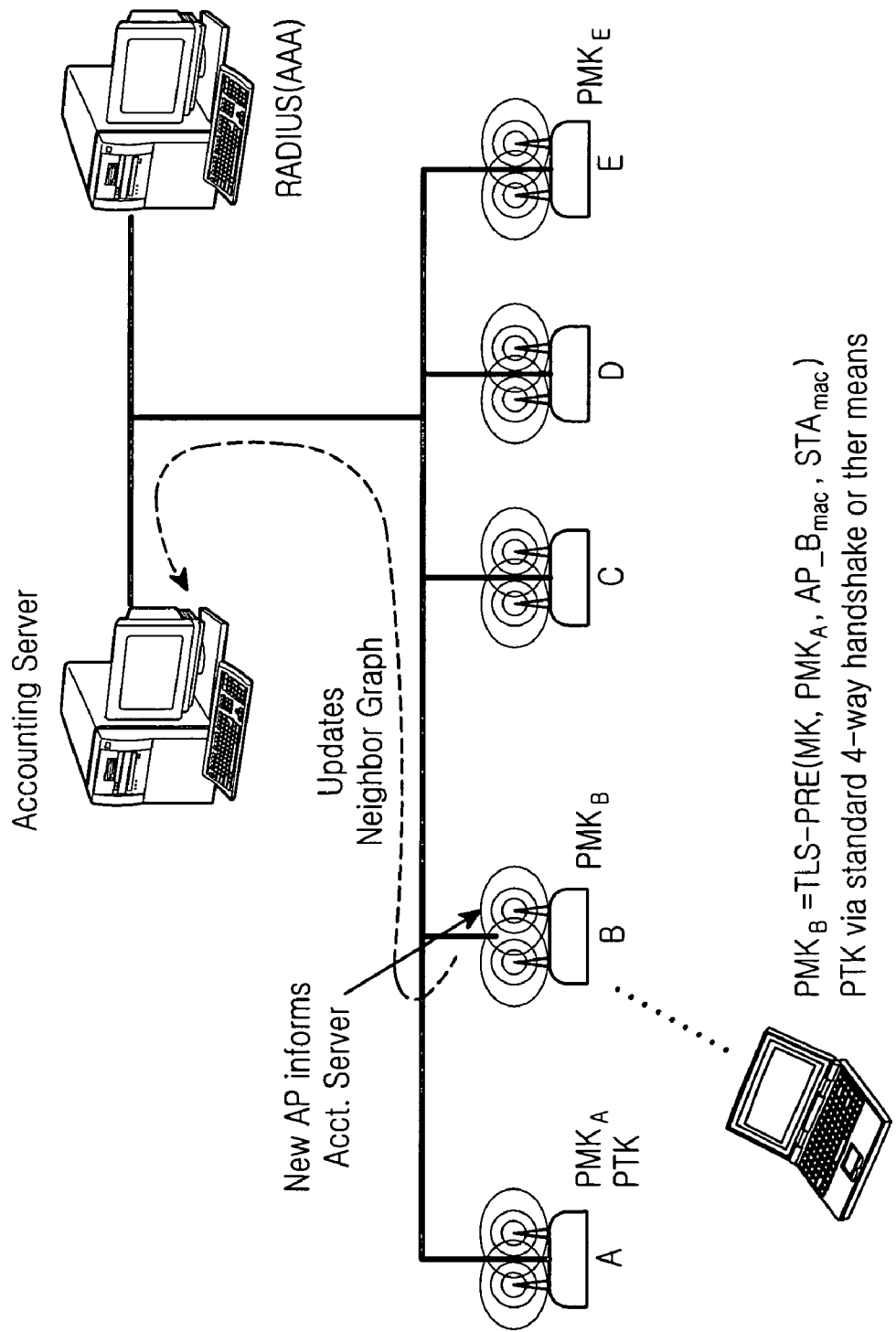

Referring to FIG. 10E, a roaming service is provided to the STA as the STA moves to AP_B. When the STA attempts to access AP_B, AP_B reports the access attempt to the accounting server. The accounting server then updates an AP-neighborhood graph for AP_B. Meanwhile, the STA acquires the PMK, $PMK_B$ required to establish a security system with AP_B by $$PMK_B = PRF(MK, PMK_A, STA_{mac}, AP\_B_{mac}) \quad (6)$$

where $PMK_A$ is a PMK assigned to AP_A, and $STA_{mac}$ and $AP\_B_{mac}$ are the MAC addresses of the STA and AP_B. The STA already has the knowledge of $PMK_A$ and $STA_{mac}$, while it cannot know $AP\_B_{mac}$ without aid from an external device. Therefore, the STA receives $AP\_B_{mac}$ from AP_A, or from AP_B after it moves to AP_B. Alternatively, the STA may receive $PMK_B$ from AP_B, instead of generating $PMK_B$ directly. This is possible on the assumption that AP_B has $PMK_B$, which has been described earlier.

Once AP_B and the STA know $PMK_B$, they can acquire a PTK from $PMK_B$ in a known manner. Thus, the method of deriving the PTK from $PMK_B$ will not be described here.

In the above-described procedure, the STA and AP_B share the same PTK. This implies that a security system has been established between the STA and AP_B. Therefore, a communication service provided from AP_A can be resumed between the AP_N and the STA.

Figure 11:
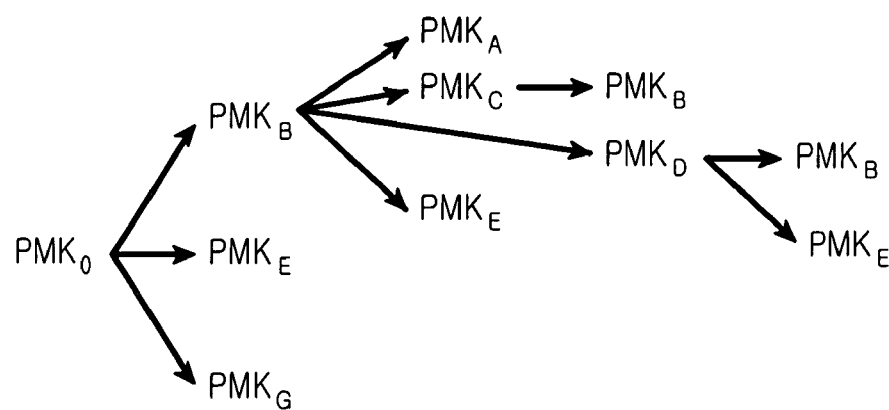
FIG. 11 illustrates an example of PMKs generated for a particular STA roam pattern.

FIG. 11 illustrates an example of PMK generation when the STA roams in a pattern of AP_A, AP_B, and AP_C or AP_D in this order.

Referring to FIG. 11, as the STA initially associates to AP_A, $PMK_0$ is generated in a first generation stage. In a second generation stage, the AS generates $PMK_B$ for AP_B from $PMK_0$ in preparation for roaming of the STA to AP_B. As the STA roams to AP_B, the AS generates $PMK_C$ for AP_C from $PMK_B$ in preparation for roaming of the STA to AP_C in a third generation stage. In a fourth generation stage, the AS generates $PMK_D$ for AP_D from $PMK_B$ and $PMK_B$ for AP_B from $PMK_C$ in preparation for roaming of the STA to AP_D or AP_B. In a fifth generation stage, the AS generates $PMK_B$ for AP_B and $PMK_E$ for AP_E from $PMK_D$ in preparation for roaming of the STA from AP_D to AP_B or AP_E.

Sequential generation of a PMK for the next AP from a PMK for the previous PMK and generation of PMKS for next PMKs from the same previous PMK have been described. Only normal transfer of the PMKs from an AP to the neighbor APs has been considered in the above description. Nonetheless, erroneous PMK transfer causes no security problems because a neighbor AP can acquire a PMK in the conventional roaming process when it fails to acquire the PMK due to the erroneous PMK transfer.

Figure 13:
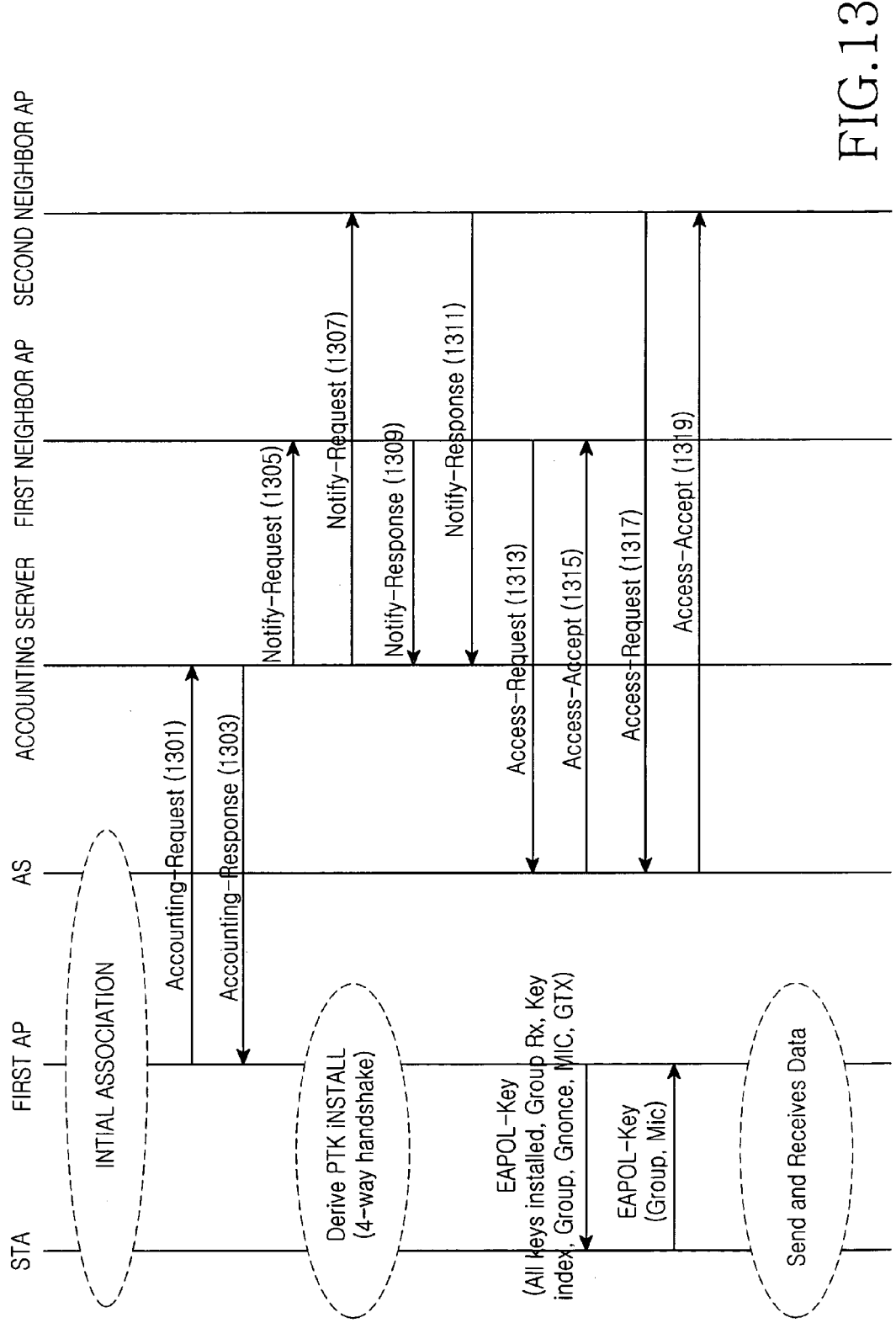
FIG. 13 is a diagram illustrating signaling before roaming according to the second embodiment of the present invention.

FIG. 13 is a diagram illustrating signaling before the STA roams according to the second embodiment of the present invention. In FIG. 13, an AP that the STA initially associates with is called a first AP, and potential APs to which the STA may move are called first and second neighbor APs, respectively.

Figure 12:
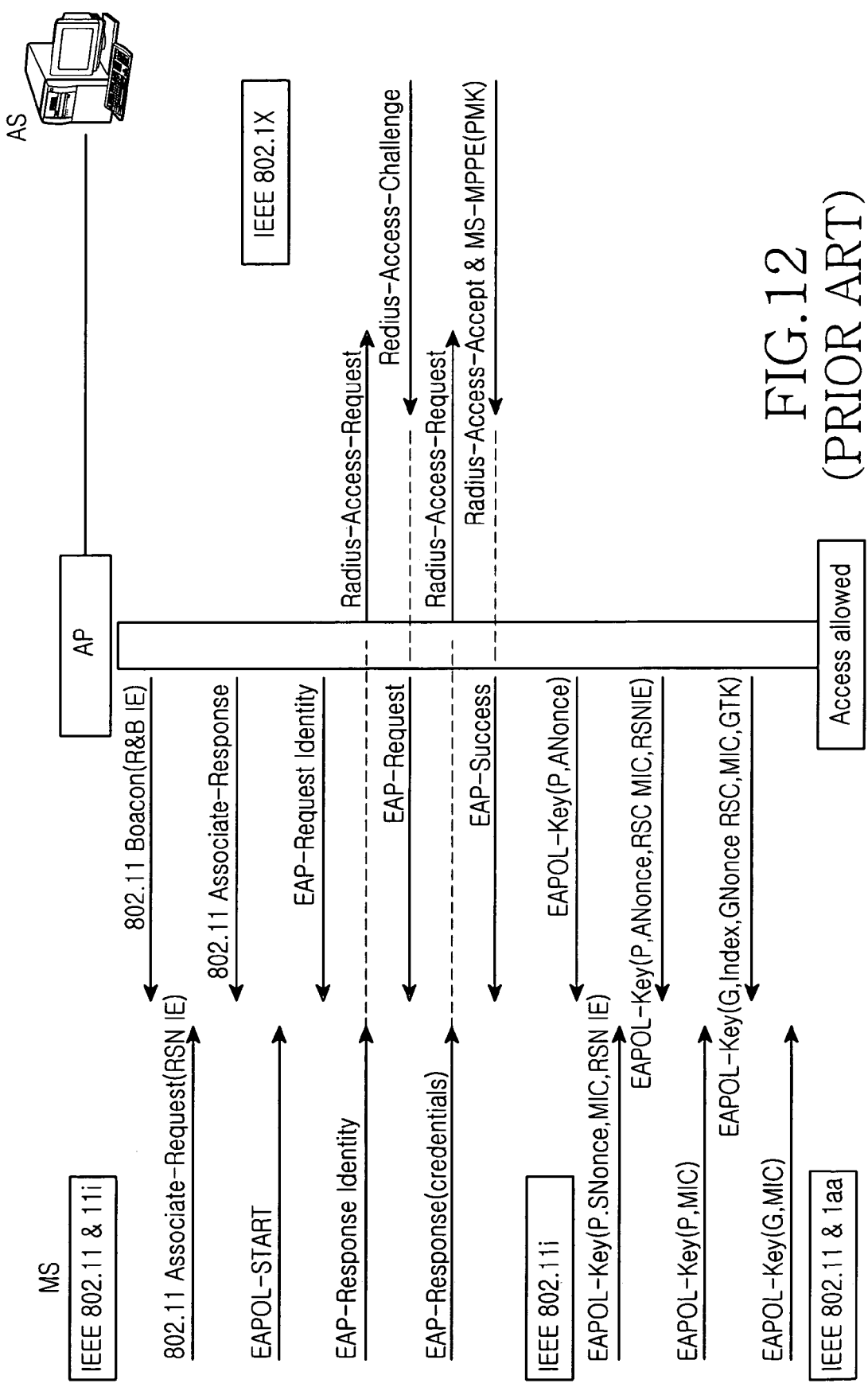
FIG. 12 is a diagram illustrating signaling for initial association in the typical WLAN.

Referring to FIG. 13, an initial association procedure is carried out among the STA, the first AP and the AS, as illustrated in FIG. 12 for acquisition of security keys needed for the initial association. In step 1301 the first AP notifies the accounting server of the start of a communication service with the STA by an Accounting-Request message including Acct-Multi-Session-ID and PMK-Generation. Upon receipt of the Accounting-Request message, the accounting server determines whether an AP-neighborhood graph is managed for the first AP and transmits an Accounting-Response message to the first AP in step 1303. At the same time, the accounting server confirms that the first and second neighbor APs exist for the first AP by the AP-neighborhood graph.

The accounting server transmits a Notify-Request message to the first neighbor AP in step 1305 and to the second neighbor AP in step 1307. The Notify-Request message indicates the association of the STA to the first AP. This message delivers information about Acct-Session-ID, Acct-Multi-Session-ID, and PMK-Generation. By receiving the Notify-Request message, the first and second neighbor APs consider that the STA may move from the first AP to them. The first neighbor AP transmits a Notify-Response Message to the accounting server in step 1309 and the second neighbor AP transmits another Notify-Response Message to the accounting server in step 1311.

The first and second neighbor APs transmit to the AS an Access-Request message including Acct-Session-ID, Acct-Multi-Session-ID and PMK-Generation in steps 1313 and 1317, respectively.

Upon receipt of the Access-Request message from the first neighbor AP, the AS generates a PMK for the first neighbor AP. In step 1315, the AS transmits to the first neighbor AP an Access-Accept message including the generated PMK. The Access-Accept message delivers information about Acct-Session-ID, Acct-Multi-Session-ID, PMK-Generation, PMK and Timeout. By receiving the Access-Accept message, the first neighbor AP acquires the PMK for a security system which allows secure communication with the STA after the STA moves to the first neighbor AP.

Upon receipt of the Access-Request message from the second neighbor AP, the AS generates a PMK for the second neighbor AP and transmits to the second neighbor AP an Access-Accept message including the generated PMK in step 1319. The Access-Accept message delivers information about Acct-Session-ID, Acct-Multi-Session-ID, PMK-Generation, PMK and Timeout. By receiving the Access-Accept message, the second neighbor AP acquires the PMK for a security system which allows secure communication with the STA after the STA moves to the second neighbor AP.

Meanwhile, the STA and the first AP perform typical operations needed for a communication service between them, such as acquisition of a PTK by 4-way handshake. When the communication service is available, the STA and the first AP transmit/receive communication service data.

Figure 14:
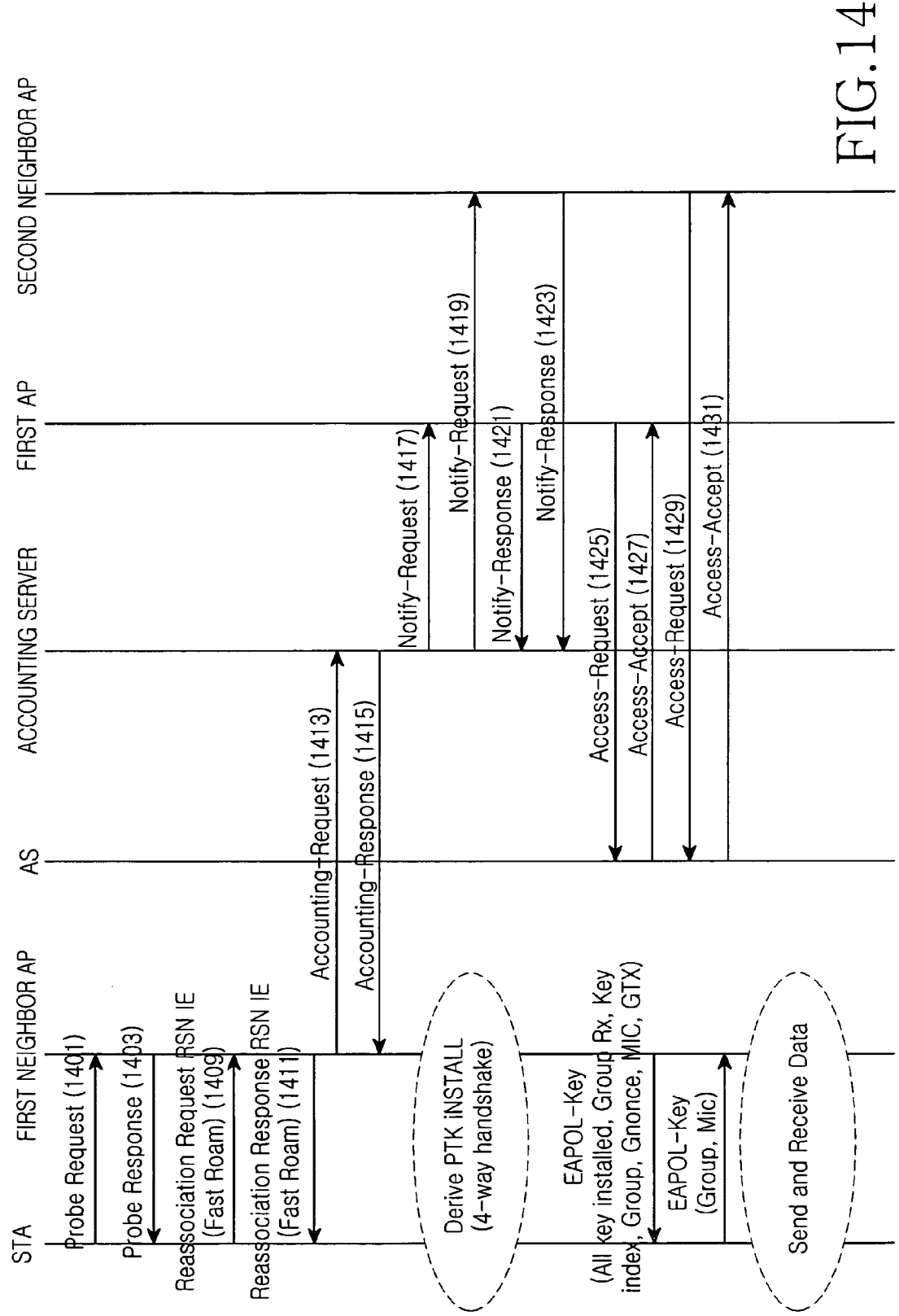
FIG. 14 is a diagram illustrating signaling after roaming according to the second embodiment of the present invention.

FIG. 14 is a diagram illustrating signaling after the STA roams according to the second embodiment of the present invention. In FIG. 14, the STA moves from the first AP to the first neighbor AP and the first AP and the second neighbor AP are neighbor APs to the first neighbor AP.

Referring to FIG. 14, after the STA moves to the first neighbor AP, it attempts to reassociate to the first neighbor AP by transmitting a Probe Request message to the first neighbor AP in step 1401. In step 1403, the first neighbor AP transmits to the STA a Probe Response message in response to the Probe Request message. The STA transmits a Reassociation Request RSN IE to the first neighbor AP in step 1409 and the first neighbor AP transmits a Reassociation Response RSN IE to the STA in step 1411.

Meanwhile, the first neighbor AP transmits an Accounting-Request message to the accounting server to report the reassociation of the STA to the first neighbor AP in step 1413. The Accounting-Request message contains information about Acct-Multi-Session-ID and PMK-Generation. Upon receipt of the Accounting-Request message, the accounting server updates the AP-neighborhood graph corresponding to the first neighbor AP. The accounting server transmits an Accounting-Response message to the first neighbor AP in step 1415. At this time, the accounting server confirms by the AP-neighborhood graph that the first AP and the second neighbor AP are neighboring to the first neighbor AP.

The accounting server transmits a Notify-Request message to the first AP in step 1417 and to the second neighbor AP in step 1419. The Notify-Request message indicates the association of the STA to the first neighbor AP. This message delivers information about Acct-Session-ID, Acct-Multi-Session-ID, and PMK-Generation. By receiving the Notify-Request message, the first AP and the second neighbor AP consider that the STA may move from the first neighbor AP to them. The first AP transmits a Notify-Response Message to the accounting server in step 1421 and the second neighbor AP transmits another Notify-Response Message to the accounting server in step 1423.

Upon receipt of the Notify-Request message, the first AP transmits an Access-Request message to the AS in step 1425. The Access-Request message contains information about Acct-Session-ID, Acct-Multi-Session-ID, and PMK-Generation.

Upon receipt of the Notify-Request message from the first AP, the AS generates a PMK for the first AP, for example, referring to the information included in the Access-Request message. The AS then transmits an Access-Accept message to the first AP in step 1427. The Access-Accept message contains information about Acct-Session-ID, Acct-Multi-Session-ID, PMK-Generation, PMK and Timeout. By receiving the Access-Accept message, the first AP acquires the PMK for a security system which allows secure communication with the STA after the STA moves to the first AP.

Upon receipt of the Notify-Request message, the second neighbor AP transmits an Access-Request message to the AS in step 1429. The Access-Request message contains information about Acct-Session-ID, Acct-Multi-Session-ID, and PMK-Generation.

Upon receipt of the Notify-Request message from the second neighbor AP, the AS generates a PMK for the second neighbor AP, for example, referring to the information included in the Access-Request message. The AS then transmits an Access-Accept message to the second neighbor AP in step 1431. The Access-Accept message contains information about Acct-Session-ID, Acct-Multi-Session-ID, PMK-Generation, PMK and Timeout. By receiving the Access-Accept message, the second neighbor AP acquires the PMK for a security system which allows secure communication with the STA after the STA moves to the second neighbor AP.

Meanwhile, the STA and the first neighbor AP perform typical operations needed for a communication service between them, such as acquisition of a PTK by 4-way handshake. When the communication service is available, the STA and the first neighbor AP transmit/receive communication service data.

It can be further contemplated as other embodiments that the step of determining whether to apply the inventive roaming technique between an STA and APs is further performed in addition to the procedures according to the first and second embodiments of the present invention. For example, the STA notifies whether it supports fast roaming by one of reserved bits in the RSN IE of a Reassociation-Request message. The AP notifies whether it supports fast roaming by the same bit of a Reassociation-Response message. A PMK acquired for the STA can be provided by the bit.

Figure 15:
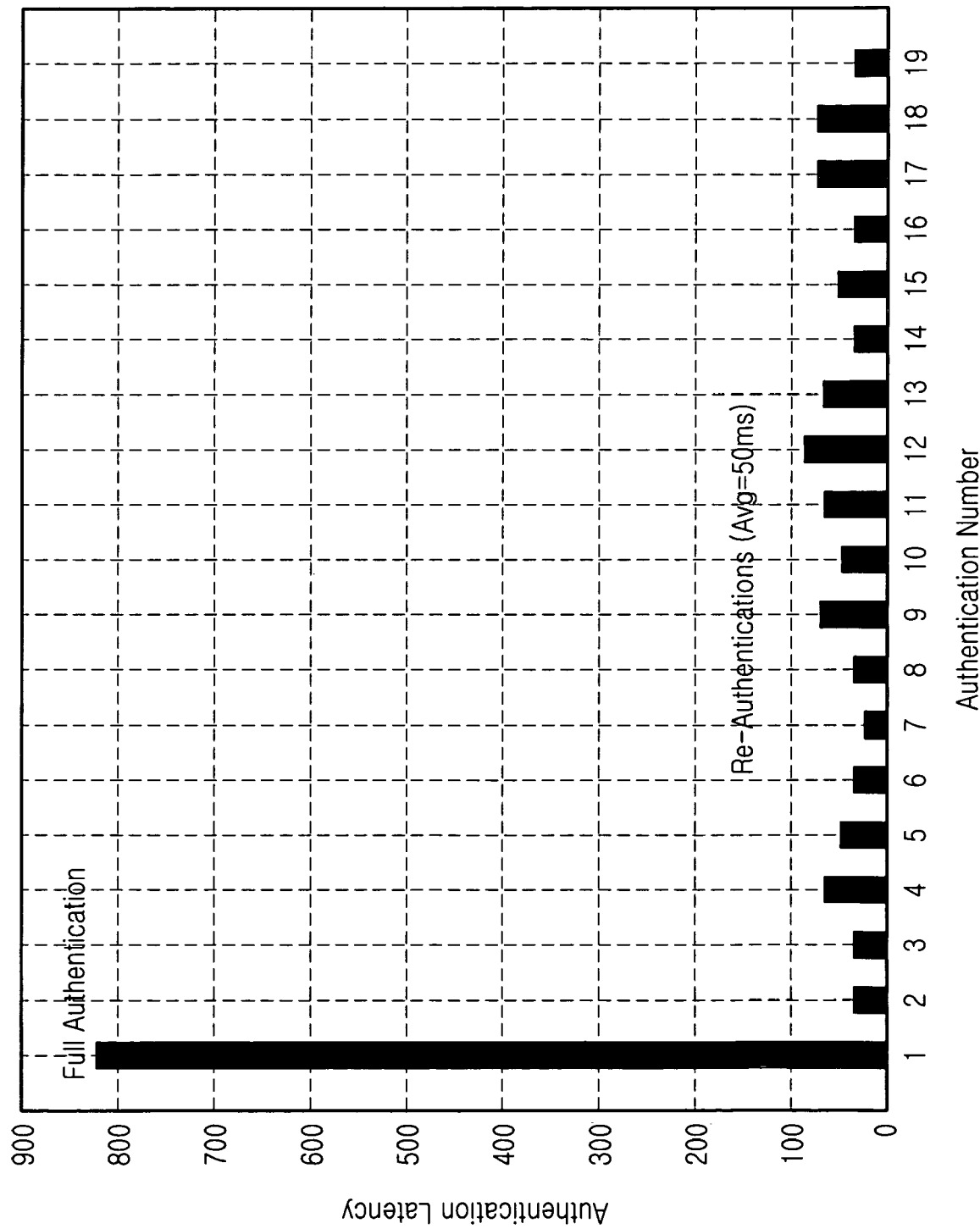
FIG. 15 is a graph comparing experiment results for a conventional roaming scheme (full authentication) and a roaming scheme of the present invention (re-authentications).

FIG. 15 is a graph illustrating the results of an experiment that compares the conventional roaming scheme (full authentication) with the inventive roaming scheme (re-authentications). As noted from FIG. 15, latency of about 800 ms was observed in the full authentication, whereas the latency was reduced to 50 ms on an average in the re-authentications. Thus the conclusion is drawn that the inventive roaming scheme supports fast roaming.

As described above, the present invention offers a simplified roaming process and so reduces roaming time, resulting in communication implementation speedup between an STA and a new-AP in a WLAN. Also, service quality is stably ensured and fast roaming is enabled.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of supporting a roaming service in a wireless network having an authentication server and a plurality of access points (APs) connected to the authentication server, the method comprising:

deriving from a known master key a first-level security key to be shared between a station STA and an AP with which the STA attempts to associate when the STA attempts to associate with one of the plurality of APs;

deriving from the first-level security key a second-level security key to be shared between the STA and at least one neighbor AP, the at least one neighbor AP neighboring to the AP with which the STA attempts to associate; and providing the second-level security key to the at least one neighbor AP, wherein when the STA attempts to roam to the at least one neighbor AP, the at least one neighbor AP pre-authenticates the STA with the second-level security key.

2. The method of claim 1, wherein the first-level security key is a first-level pairwise master key and the second-level security key is a second-level pairwise master key.

3. The method of claim 2, further comprising deriving from the first-level pairwise master key in the AP with which the STA attempts to associate a pairwise transient key.

4. The method of claim 2, further comprising deriving from the second-level pairwise master key in the at least one neighbor AP a pairwise transient key.

5. The method of claim 2, wherein deriving a second-level security key to be shared between the STA and at least one neighbor AP from the first-level security key comprises deriving from the first-level pairwise master key the second-level pairwise master key, considering a Medium Access Control (MAC) address of the STA.

6. The method of claim 1, wherein the at least one neighbor AP is an AP to which the STA can roam without passing through a coverage area of another AP.

7. The method of claim 6, wherein the STA attempts to associate with the AP by roaming from the at least one neighbor AP.

8. In a wireless network having an authentication server and a plurality of access points (APs) connected to the authentication server, a method of supporting a roaming service in one of the plurality of APs, comprising:

receiving from the authentication server a first-level security key derived from a known master key when a station (STA) attempts to associate with an AP;

deriving from the first-level security key a second-level security key for at least one neighbor AP, the at least one neighbor AP neighboring to the AP with which the STA attempts to associate; and providing to the at least one neighbor AP the second-level security key, wherein when the STA attempts to roam to the at least one neighbor AP, the at least one neighbor AP pre-authenticates the STA with the second-level security key.

9. The method of claim 8, wherein the first-level security key is a first-level pairwise master key and the second-level security key is a second-level pairwise master key.

10. The method of claim 9, further comprising deriving from the first-level pairwise master key a pairwise transient key.

11. The method of claim 9, further comprising deriving from the second-level pairwise master key in the at least one neighbor AP a pairwise transient key.

12. The method of claim 9, wherein deriving a second-level security key for at least one neighbor AP from the first-level security key comprises deriving from the first-level pairwise master key the second-level pairwise master key, considering a Medium Access Control (MAC) address of the STA.

13. The method of claim 8, wherein the at least one neighbor AP is an AP to which the STA can roam without passing through a coverage area of another AP.

14. The method of claim 13, wherein the STA attempts to associates with the AP by roaming from the at least one neighbor AP.

15. A method of generating a security key in a wireless network having an authentication server and a plurality of access points (APs) connected to the authentication server, the method comprising:

receiving from the authentication server a first-level pairwise master key derived from a known master key;

deriving from the first-level pairwise master key a pairwise transient key; and deriving from the first-level pairwise master key a second-level pairwise master key for at least one neighbor AP.

16. The method of claim 15, further comprising deriving from the second-level pairwise master key in the at least one neighbor AP a pairwise transient key.

17. The method of claim 16, wherein the deriving a second-level pairwise master key for at least one neighbor AP from the first-level pairwise master key comprises deriving from the first-level pairwise master key the second-level pairwise master key, considering a Medium Access Control (MAC) address of a station (STA).

18. In a wireless network having an authentication server and a plurality of access points (APs) connected to the authentication server, a method of generating a security key in a target AP to which a station (STA) associated with a serving AP attempts to roam, the method comprising:
- receiving from the serving AP a second-level pairwise master key;
- deriving from the second-level pairwise master key a pairwise transient key; and
- deriving from the second-level pairwise master key a new second-level master key for at least one neighbor AP.

19. The method of claim 18, further comprising deriving a new second-level master key for at least one neighbor AP from the second-level pairwise master key comprises deriving from the second-level pairwise master key the new second-level pairwise master key, considering a Medium Access Control (MAC) address of the STA.

20. A method of supporting a roaming service for a station (STA) in a wireless network having a server for authenticating the STA and managing accounting for the STA and a plurality of access points (APs) connected to the authentication server, the method comprising:
- receiving from a first AP association information regarding association in the server of the STA with the first AP;
- notifying by the server at least one neighbor AP that the STA has completely associated with the first AP, the at least one neighbor AP neighboring to the first AP and when the STA attempts to roam to the at least one neighbor AP;
- sending to the at least one neighbor AP a security key generated based on the association information when the at least one neighbor AP requests the security key for the STA,
- wherein the at least one neighbor AP authenticates the STA using the security key received from the server.

21. The method of claim 20, wherein the association information includes a first-level pairwise master key and a Medium Access Control (MAC) address of the STA.

22. The method of claim 21, wherein the first-level pairwise master key is derived from a master key by the first AP.

23. The method of claim 21, wherein the security key that the server sends to the at least one neighbor AP is a second-level pairwise master key derived from the first-level pairwise master key.

24. A method of supporting a roaming service for a station (STA) in a wireless network having a server for authenticating the STA and managing accounting for the STA and a plurality of access points (APs) connected to the authentication server, the method comprising:
- deriving a first-level pairwise master key to be shared between the STA and a first AP by the server when the STA attempts to associate with the first AP being one of the plurality of APs;
- deriving from the first-level pairwise master key a second-level pairwise master key; and
- providing to at least one neighbor AP neighboring to the first AP the second-level pairwise key,
- wherein when the STA attempts to roam to the at least one neighbor AP, the at least one neighbor AP authenticates the STA with the second-level pairwise master key.

25. The method of claim 24, wherein the first AP sends a Medium Access Control (MAC) address of the STA to the server, for generation of the first-level pairwise master key.

26. The method of claim 25, wherein deriving a first-level pairwise master key further comprises deriving from a master key known to the server by the server the first-level pairwise master key.

27. The method of claim 24, wherein deriving a second-level pairwise master key from the first-level pairwise master key comprises deriving from the first-level pairwise master key the second-level pairwise master key, considering a MAC address of the at least one neighbor AP by the server.

* * * * *